United States Patent [19]

Wyant et al.

[11] Patent Number: 4,832,489
[45] Date of Patent: May 23, 1989

[54] TWO-WAVELENGTH PHASE-SHIFTING INTERFEROMETER AND METHOD

[75] Inventors: James C. Wyant; Katherine Creath, both of Tucson, Ariz.

[73] Assignee: Wyko Corporation, Tucson, Ariz.

[21] Appl. No.: 841,544

[22] Filed: Mar. 19, 1986

[51] Int. Cl.[4] .............................................. G01B 9/02
[52] U.S. Cl. .................................... 356/359; 356/360
[58] Field of Search ................................ 356/359, 360

[56] References Cited

U.S. PATENT DOCUMENTS 3,694,088 9/1972 Gallagher et al. .................. 356/106
4,225,240 9/1980 Balasubramanian ................ 356/360

OTHER PUBLICATIONS

Wyant, Applied Optics, vol. 10, No. 9, Sep. 1971, pp. 2113–2118, "Testing Aspherics Using Two-Wavelength Holography".
Creath et al., Optica Acta, vol. 32, No. 12, pp. 1455–1464, "Contouring Aspheric Surfaces Using Two-Wavelength Phase Shifting Interferometry".
Cheng, "Multiple-Wavelength Phase Shifting Interferometry", Dissertation, University of Arizona, 1985.
"Two-Wavelength Phase Shifting Interferometry", Cheng and Wyant, Applied Optics, Dec. 1984, vol. 23, No. 24.
"Digital Wave-Front Measuring Interferometry: Some Systematic Error Sources", Schwider et al., Applied Optics, Nov. 1983, vol. 22, No. 21.
"An Optical Profilometer for Surface Characterization of Magnetic Media", Wyant et al., 38th Annual Meeting in Houston, TX.
"Use of an AC Heterodyne Lateral Shear Interferometer With Real-Time Wavefront Correction Systems", Wyant, Applied Optics, vol. 14, No. 11, Nov. 1975.

Primary Examiner—Davis L. Willis
Assistant Examiner—Matthew W. Koren
Attorney, Agent, or Firm—Cahill, Sutton & Thomas

[57] ABSTRACT

An improved apparatus and method are described for accurately "reconstructing" steep surface profiles, such as for aspheric surfaces, using improved two-wavelength phase-shifting interferometry, wherein single-wavelength precision is obtained over surfaces having departures of hundreds of visible wavelengths from a reference surface. The disclosed technique avoids cumulative summing of detector errors over a large detector array by computing the "equivalent" phase for each detector independently of the intensities of other detectors. Inaccurate phase data points having an equivalent fringe contrast less than a predetermined threshold are eliminated from data from which contour maps of the aspheric surface are displayed or plotted.

26 Claims, 4 Drawing Sheets

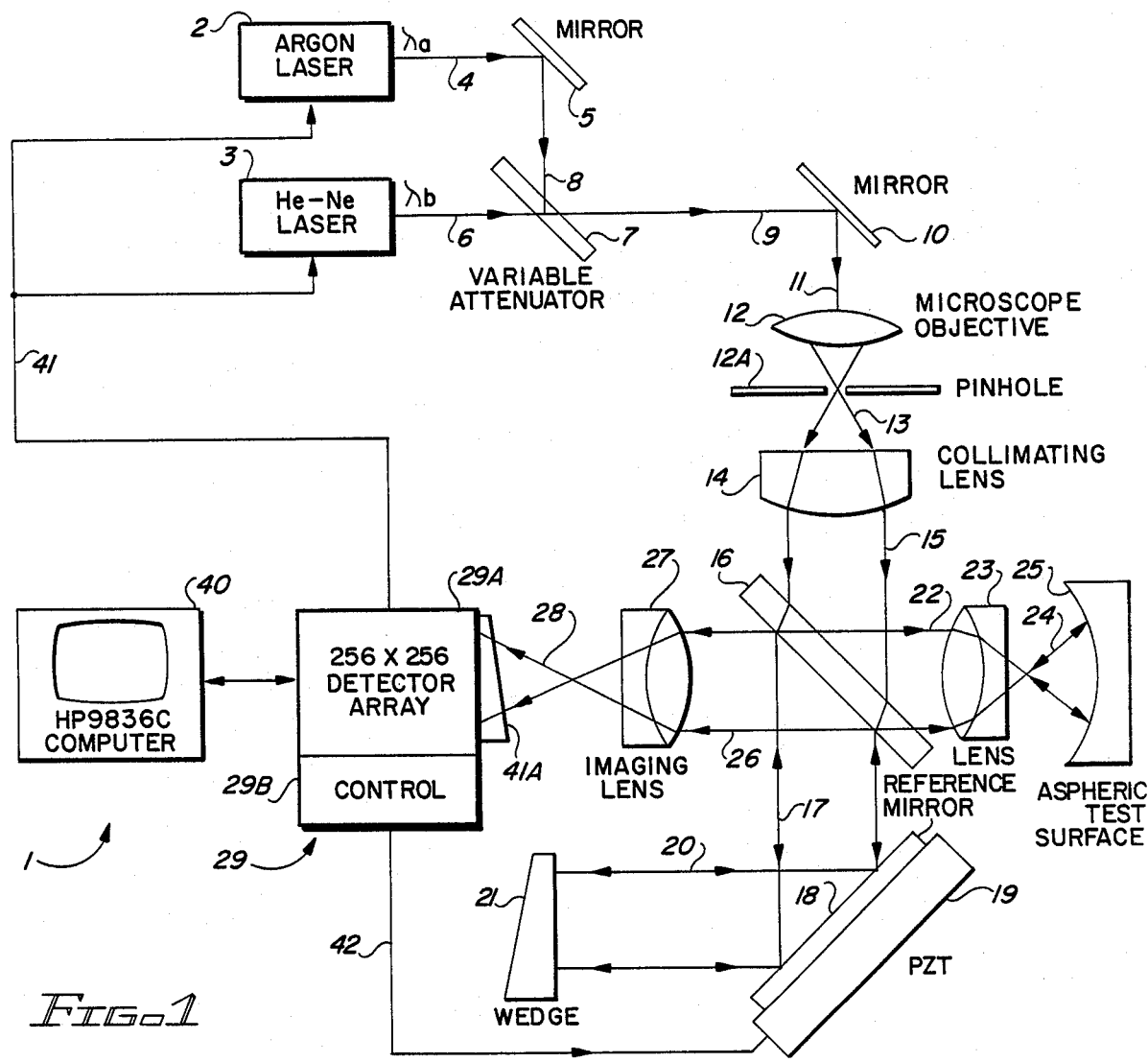
FIG. 1
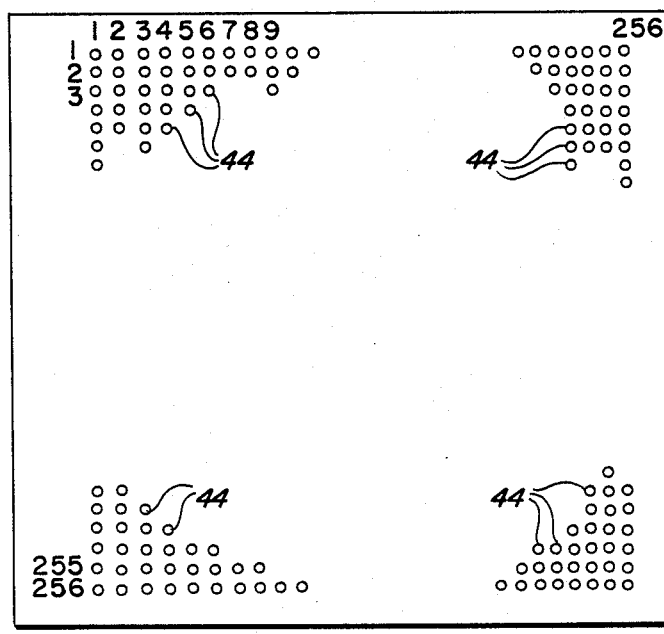
FIG. 5A
FIG. 5B

PHASE CALCULATION

TWO-WAVELENGTH PHASE-SHIFTING INTERFEROMETER AND METHOD

BACKGROUND OF THE INVENTION

The invention relates to improvements in two-wavelength phase-shifting interferometry, and more particularly, to improvements which make possible the obtaining of single-wavelength precision in interferometric measurements with the dynamic range of two-wavelength interferometric measurements, and application thereof to testing aspheric surfaces.

Two-wavelength holography and phase-shifting interferometry are known techniques for nondestructively testing optical surfaces. Numerous phase-shifting interferometry techniques and apparatus are known, wherein the phase of a wavefront is determined using a single wavelength with very high measurement precision. One such system is described in copending application Ser. No. 6/781,261, filed Sept. 27, 1985, now U.S. Pat. No. 4,639,139, issued Jan. 27, 1987 by inventors Wyant & Prettyjohns, entitled "Optical Profiler Using Improved Phase-shifting Interferometry", and incorporated herein by reference. The single-wavelength phase-shifting interferometry techniques, wherein computers are utilized to record data, compute and subtract surface errors, and compute surface height variations in the measured surface from correct phase data, are fast, require no intermediate recording step, as is required in two-wavelength holography, and avoid the inconvenience of using photographic chemicals.

Two-wavelength phase-shifting interferometry is a recent technique that extends the measurement range of single-wavelength phase-shifting interferometry, allowing the measurement of the profiles of deeper surfaces than has been previously possible with single-wavelength phase-shifting interferometry. The two-wavelength phase-shifting interferometry techniques were derived by applying phase measurement techniques, in place of intermediate recording steps wherein interference patterns were recorded on photographic film, developed, and then illuminated from the same surface with a different wavelength source, producing interference patterns referred to as MOIRE patterns, the phases of which were computed by a computer. This technique represents the closest prior art to the present invention, and is described in detail in "Two-Wavelength Phase-Shifting Interferometry", by Y. Cheng and co-inventor Wyant, "Applied Optics", Volume 23, No. 24, page 4539, Dec. 15, 1984.

The overall state-of-the-art in interferometric optical testing is well presented in the article "Recent Advances in Interferometric Optical Testing", *Laser Focus/Electro-Optics*, November 1985, page 118 to 132, by co-inventors Wyant and Creath, incorporated herein by reference.

As pointed out in the above-mentioned Cheng and Wyant paper that introduces the concept of two-wavelength phase-shifting interferometry, ordinary single-wavelength phase-shifting interferometry provides very high precision in the range from $\lambda/100$ $\lambda/1000$, peak-to-valley. In phase-shifting interferometry, the phase distribution across the interferogram is measured "modulo $2\pi$". In other words, the measured phase distribution will contain $2\pi$ discontinuities, which can only be eliminated as long as the slope of the wavefront being measured is small enough that the phase changes by less than $\pi$ between adjacent detectors or pixels of the detector array. If the latter condition is met, the phase discontinuities can be removed by adding or subtracting $2\pi$ to the measured phase until the resulting phase difference between adjacent pixels is always less than $\pi$.

Unfortunately, it is frequently desirable to be able to test surfaces that are so steep that the measured phase change between adjacent pixels will be greater than $\pi$, and the $2\pi$ ambiguities cannot be eliminated by simple addition or subtraction.

In the Cheng and Wyant paper, a technique for solving the $2\pi$ ambiguity problem is introduced, wherein two sets of phase data, with $2\pi$ ambiguities present, are stored in a computer, which then calculates the phase difference between pixels for a longer "equivalent" wavelength $\lambda_{eq}$. The paper describes an algorithm for computing the phase, wherein an elaborate mathematical summation is performed wherein the difference in phase computed at each of the two-wavelengths is computed for each pixel element, multiplied by a certain number, and the differences between the computed differences for successively adjacent pixels are summed. The problem with that technique is that errors in the computed differences for various pixels also are summed. As a practical matter, the technique described in the Cheng and Wyant paper is much less accurate than is desired, and requires far more computation time than is desirable, even though the technique represents an advance over the two-wavelength holographic techniques of the prior art, because the recording of an interferogram on film is not required, and the alignment problems associated with two-wavelength holography are avoided. In the technique of the Cheng and Wyant paper, the pixel errors increase with approximately the square root of the number of detector points in the detector array, and certain arithmetic round-off errors and electronic noise associated with the detector elements are cumulatively summed over the entire detector array. As a result, in applications wherein two-wavelength phase-shifting interferometry might be advantageous without the above-mentioned problems, such as in testing certain aspheric surfaces, it often will be necessary to instead rely on prior techniques for measuring of contouring aspheric surfaces.

Up to now, phase-shifting interferometric techniques that utilize longer equivalent wavelengths have resulted in a substantial loss of accuracy and, as a practical matter, have not been applicable to measurement of many aspheric surfaces.

Those skilled in the art recognize that economical, accurate measuring of aspheric optical components has been an important objective in the optics art. Those skilled in the art know that most optical surfaces presently are spherical surfaces. However, if it were possible to make economical aspheric surfaces, better optical performance often could be obtained. Optical systems designed with aspheric optical components may be lighter in weight, have fewer elements, and therefore have the potential for being less expensive. Designing aspheric optical components is not a major problem, as computer software for so doing has been available for quite some time. Up to now, however, fabrication of aspheric optical components has been very expensive, because there has been no inexpensive, practical means of testing them.

One prior technique for testing aspheric surfaces has been to utilize "null lenses" wherein an aspheric optical component is fabricated that exactly cancels the asphericity in the optical element being tested. Unfortunately, the aspheric null lens has to be manufactured first, using testing techniques that are very expensive. For every new optical aspheric component that is to be constructed, a separate expensive null lens must be manufactured, usually for that purpose only.

Typically, the null lens is manufactured and tested by techniques that require many spherical components precisely assembled in a manner known to those skilled in the art. Providing such an assembly of spherical lenses to test aspheric elements is known to be a difficult undertaking.

For many years, co-inventor Wyant has worked on producing computer-generated holograms that each can be used for testing a certain aspheric element of an optical system. This technique has worked, but it has been expensive and difficult because a new hologram is needed for every asphere to be tested. In order to make a single hologram, an expensive, high precision plotting device is required, and many hours are required to plot a single hologram. The prior art for testing aspheric optical components frequently involves set up costs of tens of thousands of dollars for each new aspheric optical element to be tested.

There is a substantial unmet need for a technique of improving the accuracy of two-wavelength phase-shifting interferometry to increase accuracy and reduce speed of computation.

There also is a great unmet need for an inexpensive, improved technique of testing steep aspheric surfaces without the use of null lens and holograms.

There is also a great unmet need for an improved technique of testing steep aspheric surfaces with a single test system, and for reducing the time required to test each aspheric surface.

A problem that has existed in prior phase-shifting interferometers at the present state-of-the-art has been that of operating on data stored in a computer to correct data errors produced by various sources, such as stray reflections and scattered light. Prior techniques have included the technique of determining the intensity difference between data frames computed at a single pixel or detector as the phase is shifted, and if the computed difference was too small, eliminating the computed phase. This approach often resulted in discarding good data as well as bad because the phases may have been computed from intensity measurements at points that are near a peak or valley of a fringe where the intensity does not change much between consecutive measurements.

SUMMARY OF THE INVENTION

Accordingly, it is an object of the invention to provide an improved two-wavelength phase-shifting interferometry apparatus and method that avoids the inaccuracy and long computation times of the closest prior art.

It is another object of the invention to provide an improved apparatus and technique for measuring contours of aspheric surfaces that are steeply sloped relative to a spherical surface.

It is another object of the invention to provide a single system that can accurately test a large number of different aspheric surfaces without major modification for differing aspheric surfaces to be tested.

It is another object of the invention to provide an apparatus and technique for avoiding the effect of averaging of fringes across individual detectors of a detector array having large surface areas.

It is another object of the invention to exclude invalid data points in mathematical reconstruction of a measured surface such as a steeply aspheric surface while avoiding discarding of good data points.

It is another object of the invention to provide an apparatus and technique for extending the measurement range of an interferometer while maintaining the precision and accuracy characteristic of single-wavelength phase-shifting interferometry.

Briefly described, and in accordance with one embodiment thereof, the invention provides an improved phase-shifting interferometer and method of operating wherein a light beam having a first wavelength illuminates a reference mirror via a reference arm of the interferometer, and simultaneously illuminates a test surface via a test arm of the interferometer to produce an interference pattern on an array of photodetectors, measuring the intensities of the interference wavefront on a detector of the array at a plurality of different phases of the interference pattern that are produced by shifting the reference mirror, computing a phase of the interference for the pattern at that detector for that wavelength, repeating the same procedure for a second wavelength beam, and computing an equivalent phase for that detector by computing the difference between the phases computed for the first and second wavelengths, respectively. An equivalent optical path difference for the detector is computed by multiplying the equivalent phase by an equivalent wavelength corresponding to an imaginary interference pattern between the first and second wavelength beams, and repeating the entire procedure for each detector of the array. In one described embodiment of the invention, $2\pi$ ambiguities are corrected for either the equivalent phases or the equivalent optical path difference by adding or subtracting integral multiples of $2\pi$ to the equivalent phases as necessary to make the phase difference between adjacent detectors less than $\pi$, or by adding or subtracting multiples of the equivalent wavelength to the equivalent optical path difference as needed to make the difference in the equivalent optical path difference between adjacent detectors less than one-half of the equivalent wavelength. In one embodiment of the invention, the equivalent optical path difference for all of the detectors is used to plot or display a two-dimensional or three-dimensional display of the test surface, which may be a steeply aspheric surface.

In another embodiment of the invention, the equivalent optical path difference data is utilized to determine the amount of correction needed to resolve $2\pi$ ambiguities in the phase difference data or optical path difference data corresponding to the first wavelength which, after correction for such $2\pi$ ambiguities, is then utilized to plot or display a two-dimensional or three-dimensional display of the test surface. The foregoing technique provides much greater accuracy and, in effect, provides two-wavelength phase-shifting interferometry for the large range that can be achieved for the equivalent wavelength, and the accuracy that can be achieved for single-wavelength phase-shifting interferometry at the first wavelength, without cumulative summing errors associated with prior two-wavelength phase-shifting interferometry, which summing errors are due to electronic noise, detector noise, and/or round-off errors.

In one embodiment of the invention, a mask plate is aligned over the detector array, with an array of small apertures therein, aligned with each of the detectors to effectively reduce the area of each detector such that its diameter is much less than the equivalent fringe spacing. A light intensifier may be positioned between the mask plate and the photodetector array to compensate for loss of ambient energy due to the mask, and a fiberoptic bundle is disposed between the intensifier and the photodetector array to prevent further loss of light energy and ensure that the interference pattern is imaged onto the face of the photodetector array.

BRIEF DESCRIPTION OF THE DRAWINGS

FIG. 1 is a schematic diagram of a two-wavelength phase-shifting interferometer of the present invention.

FIG. 5A is a diagram of a point mask used in conjunction with the photodetector array of FIG. 1 to reduce the effective size of each of the photodetectors of the array.

FIG. 5B is a schematic diagram illustrating the use of the point mask and an intensifier in conjunction with the photodetector array in the interferometer of FIG. 1.

DESCRIPTION OF THE INVENTION

Figure 2:
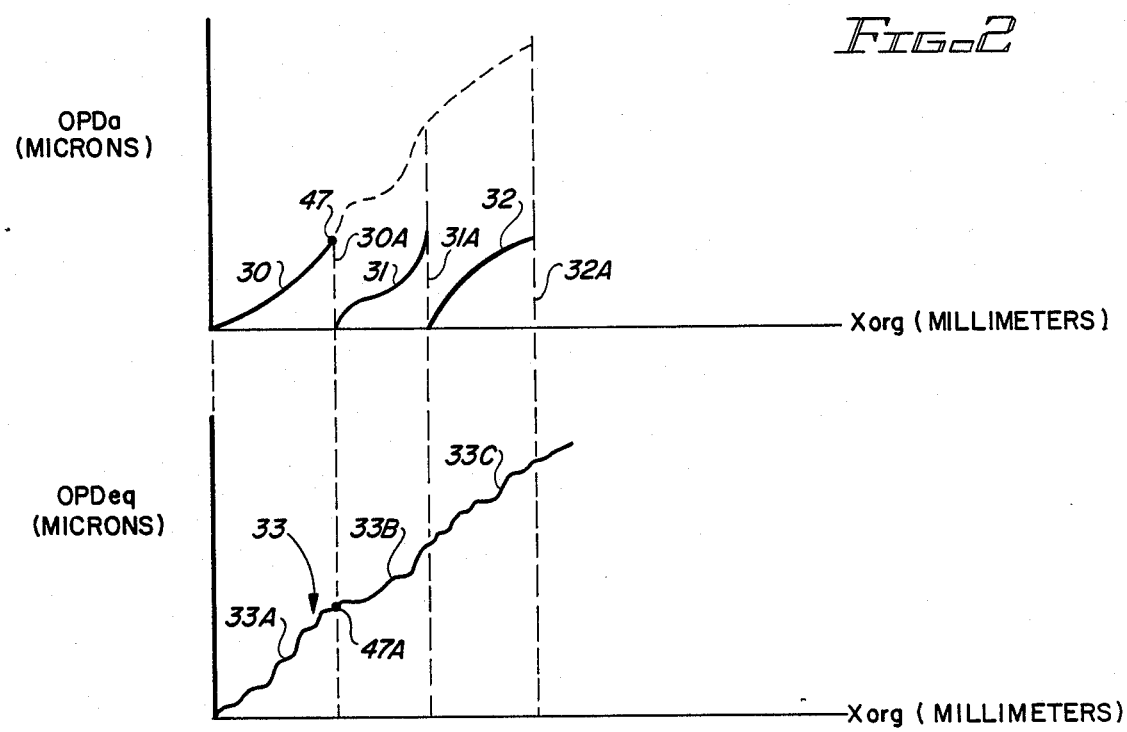
FIG. 2 shows a pair of graphs useful in describing the operation of the two-wavelength phase-shifting interferometer of FIG. 1.

Referring now to the drawings, two-wavelength interferometer 1 of FIG. 1 includes two lasers having different wavelengths $\lambda_a$ and $\lambda_b$, respectively. Laser 2 can be an argon laser producing a beam 4 of light having a wavelength $\lambda_a$ impinging upon a mirror 5. Laser 2 can be switched on and off by means of a signal on bus 41 in response to control circuitry in block 29. Similarly, laser 3, which can be a helium-neon laser producing a beam 6 having a wavelength $\lambda_b$, also is switched on and off in response to a difference signal or bus 41. Beam 6 passes through attenuator 7 to produce beam 9 when laser 3 is switched on. Beam 8 is reflected from mirror 5 and also from the surface of mirror 7 to produce beam 9 when laser 2 is on. Beam 9 is reflected from mirror 10 to produce beam 11, which enters a microscope objective 12. Microscope objective 12 focuses beam 11 onto a pinhole 12A and into a collimating lens 14, as indicated by reference numeral 13. The beam 15 emerging from collimating lens 14 impinges upon a beam splitter 16.

The beam 15 is split to produce beams 17 and 22. Beam 22 passes through a lens 23 that matches "the best fit sphere" of an aspheric test surface 25 so that the rays 24 impinge approximately perpendicularly onto aspheric test surface 25, and therefore are reflected back through lens 23 and beam splitter 16, contributing to interference beam 26 that passes through imaging lens 27, focusing interference beam 28, onto for example, a 256 by 256 detector array included in block 29. (In our experiments, however, a 100 by 100 detector array was used.) Reference numeral 41A designates a nonparallel window that reduces effects of interference between surfaces of the window and the detector array.

The portion of the interferometer including beam 22, lens 23, and aspheric test surface 25 is referred to as the test arm.

The other arm of the interferometer, referred to as the reference arm, includes beam 17 emerging from the lower surface of beam splitter 16 and reference mirror 18.

Beam 17 impinges upon reference mirror 18, which can be linearly moved in accordance with incorporated-by-reference patent application Ser. No. 781,261 (now U.S. Pat. No. 4,639,139) mentioned above. Beam 20 is reflected from reference mirror 18 onto the surface of a wedge 21 having approximately the same reflectivity as aspheric test surface 25. Beam 20 is reflected back to reference mirror 18, and then back to the lower surface of beam splitter 16, which then reflects the reference beam so that it interferes with the reflected test surface beam 22. Imaging lens 27 receives the interference beam 26 and focuses the test surface 25 onto the 256 by 256 detector array in block 29, as indicated by 28.

Bus 42 connects piezoelectric transducer 19 to control circuitry in block 29, synchronizing linear movement of reference mirror 18 with the scanning of the 256 by 256 photodiode detector array 29A in block 29 in accordance with the teachings of above-mentioned co-pending application Ser. No. 781,261. The intensity measured by each photodiode detector in the 256 by 256 array is converted to an analog signal as also described in application Ser. No. 781,261, which analog signal is operated upon by suitable programs stored in computer 40 to compute the optical path difference (OPD) between the surface of reference mirror 18 and aspheric test surface 25.

An equivalent wavelength $\lambda_{eq}$ is computed for the present values of $\lambda_a$ and $\lambda_b$ being used in accordance with the equation:

$$\lambda_{eq} = \frac{\lambda_a \lambda_b}{|\lambda_a - \lambda_b|} \tag{1}$$

Four currents are measured for each photodiode at each of the two-wavelengths $\lambda_a$ and $\lambda_b$, and for each wavelength $\lambda_a$ or $\lambda_b$, the phase of the wavefront detected is computed from the following equation:

$$\phi = \arctan \left[ \frac{\sqrt{[(A - D) + (B - C)][3(B - C) - (A - D)]}}{(B + C) - (A + D)} \right] \tag{2}$$

where A, B, C, and D represent the measured currents from the present photodetector at equally spaced time increments as the piezoelectric transducer 19 is linearly shifted. This equation is derived in "Installation Et Utilisation Du Comparateur Photoelectrique Et Interferential Du Bureau International Des Poides Et Mesures", Carre', 1966, *Metrologia*, Vol. 2, pages 13–23. If this equation is used, the same ramping rate can be used for the piezoelectric transducer 19, regardless of the wavelengths of lasers 2 and 3. It should be noted that there are various other techniques for measuring the photodetector array output and shifting the piezoelectric transducer, with different equations for computing the phase at each photodetector. For example, see "Contouring Aspheric Surfaces Using Two- Wavelength Phase-Shifting Interferometry", by Katherine Creath, Yeou-Yen Cheng, and James C. Wyant, Optica Acta, 1985, Vol. 32, No. 12, p. 1455–1464, incorporated herein by reference. Also see the above-mentioned co-pending patent application Ser. No. 781,261. If the intensity measurements and phase are obtained using the equations other than the Carre equations, the piezoelectric transducer linear ramping voltage slope may have to be adjusted for each wavelength to ensure that the phase is shifted by a precise amount. The computations will be less complex, but the accuracy will be slightly reduced.

It has been previously shown, in Wyant, 1971, Applied Optics, Vol. 10, page 2113 that an interferogram obtained with two wavelengths has an intensity distribution given by the equation:

$$I(X,Y) = 1 + \cos\left[2\pi\, OPD(X,Y)\left(\frac{1}{\lambda_a} - \frac{1}{\lambda_b}\right)\right] \quad (3)$$

The argument of the cosine term is the equivalent phase $\phi_{eq}(X,Y)$ and can be written as:

$$\phi_{eq}(X,Y) = \frac{2\pi\, OPD_{eq}(X,Y)}{\lambda_{eq}} = \phi_a(X,Y) - \phi_b(X,Y) \quad (4)$$

wherein $\phi_a$ and $\phi_b$ are the phases measured for $\lambda_a$ and $\lambda_b$, respectively.

Thus, the difference between $\phi_a$ and $\phi_b$ measured at the two wavelengths $\lambda_a$ and $\lambda_b$ yields the phase $\phi_{eq}$ associated with the equivalent wavelength of the "interference" pattern that would be generated between $\lambda_a$ and $\lambda_b$ if two-wavelength holography techniques were utilized.

It was not recognized by co-inventor Wyant, in spite of considerable reflection by him on the matter, that $\phi_{eq}$ could, as a practical matter, be obtained by equation (4), because both $\phi_a$ and $\phi_b$ are computed "modulo $2\pi$" and, in accordance with the nature of the arctangent function, have discontinuities every 360 degrees. It was thought that the discontinuities would be indeterminate for $\phi_a$ and $\phi_b$ since the intensity measurements were taken at different wavelengths $\lambda_a$ and $\lambda_b$, respectively. One would ordinarily not consider it a practical thing to add or subtract terms with indeterminate or undefined discontinuities in order to obtain a term such as $\phi_{eq}$ that needs to be extremely precise.

Once the value of $\phi_{eq}$ is obtained in accordance with equation (4), with $\phi_a$ and $\phi_b$ being obtained in accordance with equation (2), the next step (if desired) is to compute the equivalent optical path difference in accordance with the equation:

$$OPD_{eq}(X,Y) = \frac{\phi_{eq}(X,Y)}{2\pi}\lambda_{eq} \quad (5)$$

for each detector element.

To operate the two-wavelength phase-shifting interferometer of FIG. 1, lasers 2 and 3 are aligned so that the beams 9 and 11, are colinear up to collimating lens 14. Using an uncoated aspheric test surface 25, and using the above-mentioned RETICON 100 by 100 photodiode array, the number of interference fringes appearing on the detector array 29A was controlled by positioning the detector array 29A and the imaging lens 27. The wavelength $\lambda_a$ was either 0.4880 microns or 0.5145 microns. $\lambda_b$ was 0.6328 microns. At each detector, argon laser 2 is turned on, thereby illuminating the array 29A, and the piezoelectric transducer 19 is shifted by linearly advancing it to allow three or four intensity measurements (depending on the method of phase computation used) from that photodiode to be measured and digitized by an analog-to-digital converter and then read by computer 40. The argon laser 2 then is switched off, helium-neon laser 3 is switched on, the piezoelectric transducer returned to its initial point, and the above procedure is repeated for the same photodiode.

Figure 3A:
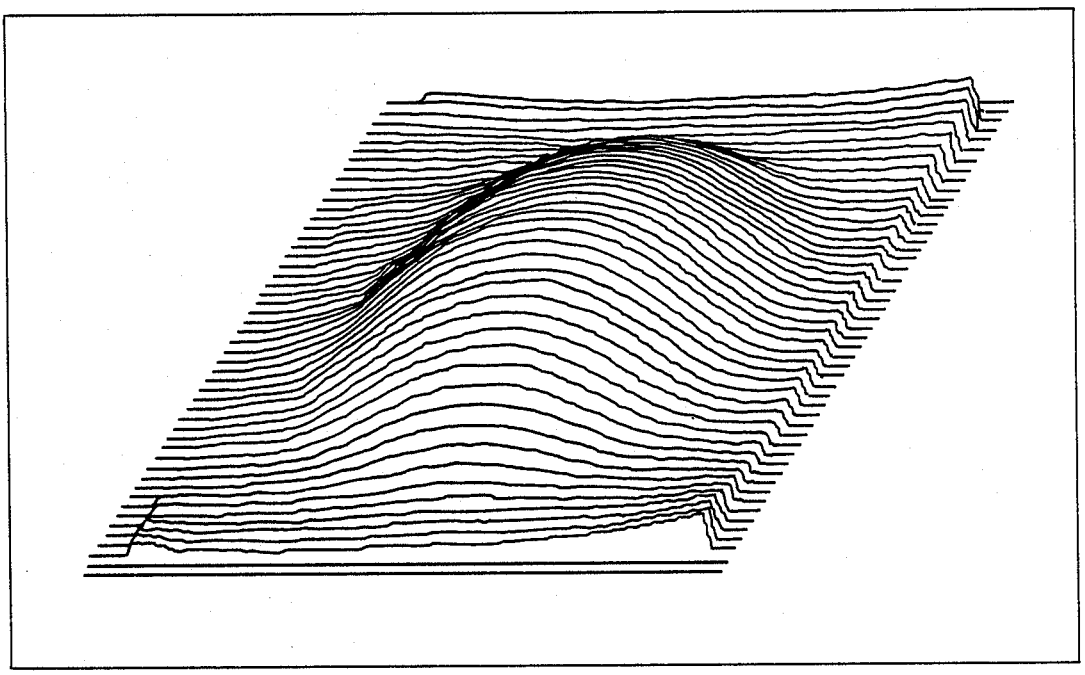
FIGS. 3A and 3B show two graphs of three-dimensional countour plots of an aspheric surface, one measured by prior art single-wavelength phase-shifting interferometry and another measured by the apparatus of FIG. 1 in accordance with the present invention.

Using an appropriate display or plotting routine that can be executed by computer 40, a three-dimensional contour map of the aspheric surface 25 can be displayed on a screen of computer 40 or plotted on a plotter. FIG. 3A shows the displayed result obtained using the above-described method, the individual curves representing the equivalent optical path difference $OPD_{eq}(X,Y)$, with tilt being subtracted by the software in a conventional manner. It can be seen that the contour map of FIG. 3A has no discontinuities.

Figure 3B:
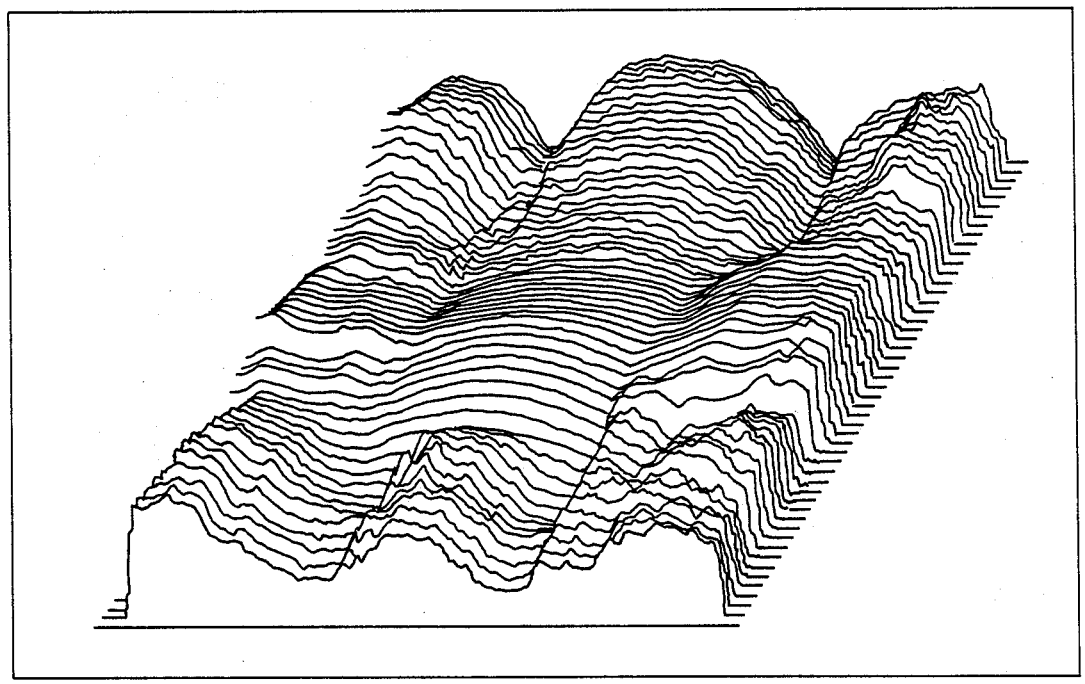

FIG. 3B shows a contour map of the same aspheric test surface 25 generated using single-wavelength phase-shifting interferometry for the $\lambda_a$ laser wavelength only. It can be readily seen that there are many discontinuities and inaccuracies in the contour map of FIG. 3B.

It should be noted that $\phi_{eq}$ as computed by equation (4) must be adjusted by eliminating the above-mentioned $2\pi$ ambiguities by adding or subtracting integer multiples of $2\pi$ until the difference in $\phi_{eq}$ between successive photodiodes is less than $\pi$. Alternately, $2\pi$ ambiguities can be adjusted in $OPD_{eq}$ by adding or subtracting integer multiples of $\lambda_{eq}$ until the difference in $OPD_{eq}$ is less than one-half of $\lambda_{eq}$.

It also should be noted that the above technique is only valid if the condition that $\lambda_{eq}$ is sufficiently large that there is no more one-half of an "equivalent" fringe (i.e., $\lambda_{eq}$ wavelengths) between adjacent photodetectors in array 29A. ("Equivalent" fringes are fringes that would be produced by an interference pattern produced by $\lambda_a$ and $\lambda_b$ using two-wavelength holography, as described above.)

It should be appreciated that the accuracy of $OPD_{eq}(X,Y)$ is less than the accuracy of $OPD_a$ or $OPD_b$ because inaccuracies due to photodetector noise and electronic noise are scaled up by the ratio of $OPD_{eq}$ to the single-wavelength optical path difference. If greater accuracy is needed, the technique of the invention can be expanded by using the equivalent $OPD_{eq}$ data to determine precisely where to correct the $2\pi$ ambiguities in the single-wavelength OPD data. How this is accomplished can be understood with reference to FIG. 2.

In FIG. 2, curves 30, 31, and 32 designate the optical path difference computed for the single-wavelength "interferogram" $2\pi$ discontinuities by measuring aspheric test surface 25. Reference numeral 31A designates the first $2\pi$ ambiguity, the amplitude of which is indeterminate. Reference numeral 30A designates the values of $OPD_a$ computed until the next indeterminate $2\pi$ ambiguity occurs, as indicated by reference numeral 31A. Curve 32 designates the values of $OPD_a$ continuing until the next indeterminate $2\pi$ ambiguity 32A.

It should be appreciated that the actual optical path difference for the aspheric surface 25 might change a great deal, i.e., much more than $\lambda_a$, between adjacent pixels or photodetector elements, if the surface being measured is "steep", i.e., varies greatly from a spheric surface. Therefore, there is no way of knowing how many multiples of $\lambda_a$ need to be added to (or subtracted from) curve 31 to move its left most point up to match point 47, and thereby eliminate the $2\pi$ ambiguity 30A. However, the information in curve 33, although much less accurate than that in curves 30, 31, and 32 (because of the above mentioned scaling), can be utilized to determine how many multiples of $\lambda_a$ need to be added to curve 31 to eliminate the $2\pi$ discontinuity 30A.

Note that the "roughness" of curve 33 represents the relative inaccuracy of $OPD_{eq}$ compared to $OPD_a$. Due to the fact that $\lambda_{eq}$ is much longer than $\lambda_a$, there are no $2\pi$ discontinuities in curve 33. Therefore, point 47A of curve 33B can be compared with point 47 of curve 30. Note that point 47 corresponds to the first photodetector diode or pixel before the $2\pi$ discontinuity 30A occurs in FIG. 2, and point 47A corresponds to the first detector after the $2\pi$ ambiguity 30A. An integral number of $\lambda_a$ wavelengths determined by equation (6) below are added to or subtracted from $OPD_a$ for curve 31 to cause point 47A to closely match point 47, within one half of $\lambda_a$.

It should be noted that the above explanation with reference to FIG. 2 of resolving $2\pi$ ambiguities can be performed on $\phi_{eq}$ and $\phi_a$ which differ from the optical path differences only by the scaling factor $2\pi/\lambda_{eq}$ or $2\pi/\lambda_a$.

The following equation expresses this computation of the number N of $\lambda_a$ wavelengths added or subtracted to "resolve" the above-described $2\pi$ ambiguity 30A:

$$[OPD_a \pm N\lambda_a] - OPD_{eq} < \frac{\lambda_a}{2} \qquad (6)$$

where N is an integer.

Stated differently, what expression (6) means is that an integral number of $\lambda_a$'s are added to and/or subtracted from a $OPD_a$ until the difference between that quantity and the equivalent optical path difference $OPD_{eq}$ is less than half of $\lambda_a$. (Note that this technique yields proper results if there is no chromatic aberration present in the optics of the interferometer. If such errors are present, then a more complex technique is required).

Thus, the present invention can result in nearly the same accuracy in measuring a surface as is obtained using short (visible), single-wavelength phase-shifting interferometry, while also obtaining the much larger range of optical path differences that can be obtained with two-wavelength holography.

Comparing this technique with the two-wavelength phase-shifting interferometry techniques described in the above-mentioned Cheng and Wyant article, much greater accuracy is achieved, and much shorter computation times are achieved. This is because of the simplicity of the computation of equation (4) above, wherein the equivalent phase $\phi_{eq}$ is computed by simply subtracting the computed quantity $\phi_b$ from $\phi_a$ and computing $OPD_{eq}$ from equation (5) for each photodiode.

If a particular photodiode produces an erroneous signal, due to externally induced noise or an intrinsic junction defect, that error will affect only one value of $OPD_{eq}$. All other values of $OPD_{eq}$ obtained will be independent of that error. In contrast, in the Cheng and Wyant reference, the differences in the OPDs between each adjacent pair of photodiodes is obtained by subtraction, and these differences are summed, as indicated in equations (9) in the Cheng and Wyant reference, wherein any error occurring as a result of nise or other inaccuracy, including computational round-off errors, occurring in any first pixel or photodiode will be added to the optical phase difference computed for every subsequently scanned photodetector.

Thus, while the technique described in the Cheng and Wyant article represents a significant advance in the art, the present above-described invention results in a significant improvement that finally makes two-wavelength phase-shifting interferometry a highly practical means of reducing the costs of testing aspheric optical components, making the total manufacturing costs thereof much less than has been the case up to now.

A computer algorithm, subsequently described with reference to the flow chart of FIG. 4A, was written to make the computations of equations (2), (4), and (7). During the phase calculations, saturated data points, wherein overly large photodiode currents were generated, and points wherein the modulation of the currents or intensity from one pixel or photodiode to the next were too small, were neglected.

Figure 4A:
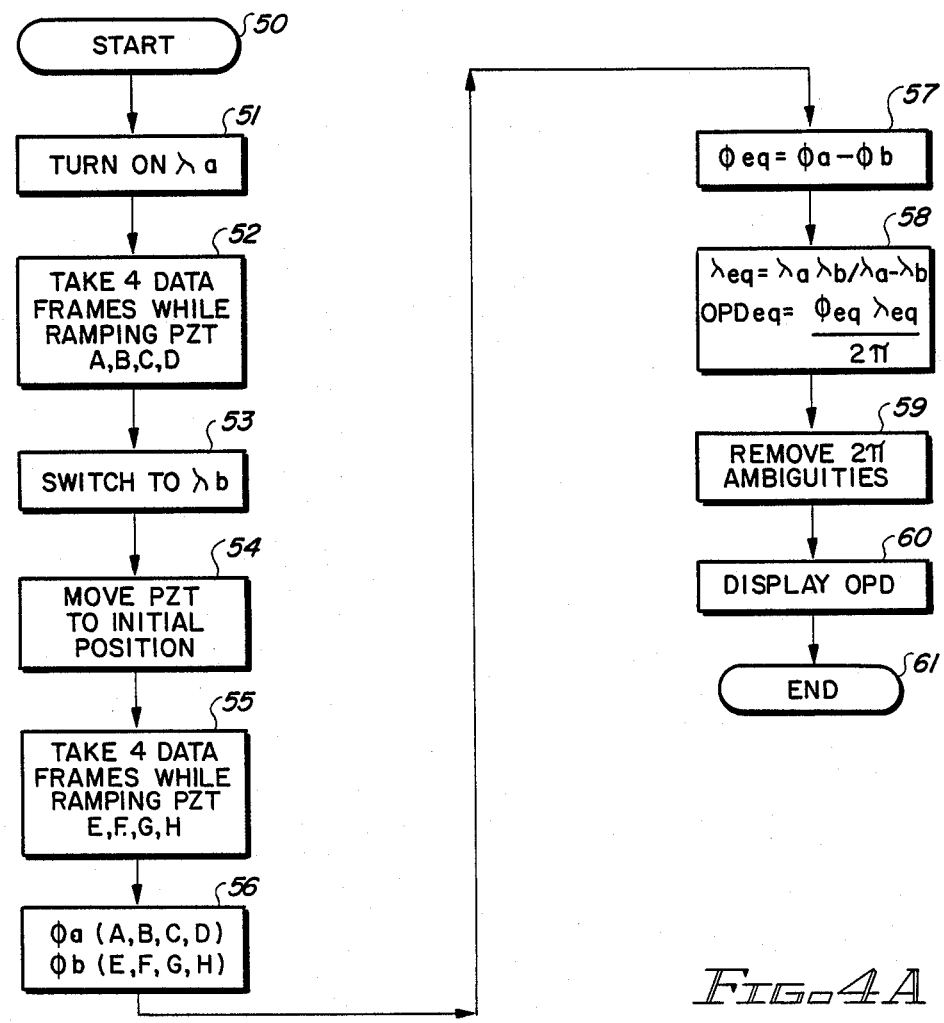
FIGS. 4A and 4B constitute a flow chart of a program executed by the computer of the two-wavelength phase-shifting interferometer of FIG. 1 to carry out the method of the present invention.

Referring now to FIG. 4A, which shows the above-mentioned flow chart, the algorithm is entered at label 50. In block 51, laser 2 is switched on. The program then goes to block 52 and causes the control circuitry 29B to cause appropriate ramping of the reference mirror 18 by the piezoelectric transducer 19 and scanning of the detector array 29A to obtain the four measurement A, B, C, and D. The program stores A, B, C, and D and then goes to block 53, switches off laser 2, and switches on laser 3. In block 54, the program initializes the position of the piezoelectric transducer 19. In block 55, the program again causes ramping of the piezoelectric transducer and scanning of the detector array 29A, exactly as in block 52, and stores the four resulting measurements of E, F, G, and H.

Next, the program goes to block 56 and computes the phases $\phi_a$ and $\phi_b$, wherein $\phi_a$ is a function A, B, C, and D and $\phi_b$ is a function of E, F, G, and H. These calculations are made in accordance with equation (2) above; the details of the computations are shown in the flow chart of FIG. 4B.

Next, the program goes to block 57 and uses equation (4) to compute $\phi_{eq}$.

The program then goes to block 58, and computes $\lambda_{eq}$ in accordance with equation 1 and computes $OPD_{eq}$ in accordance with equation (5). Then the program goes to block 59 and removes the $2\pi$ ambiguities from $\lambda_{eq}$ and from $\lambda_a$ in accordance with the above-described techniques. Finally, the program goes to block 60, displays the corrected optical path differences, and exits at label 61.

Figure 4B:
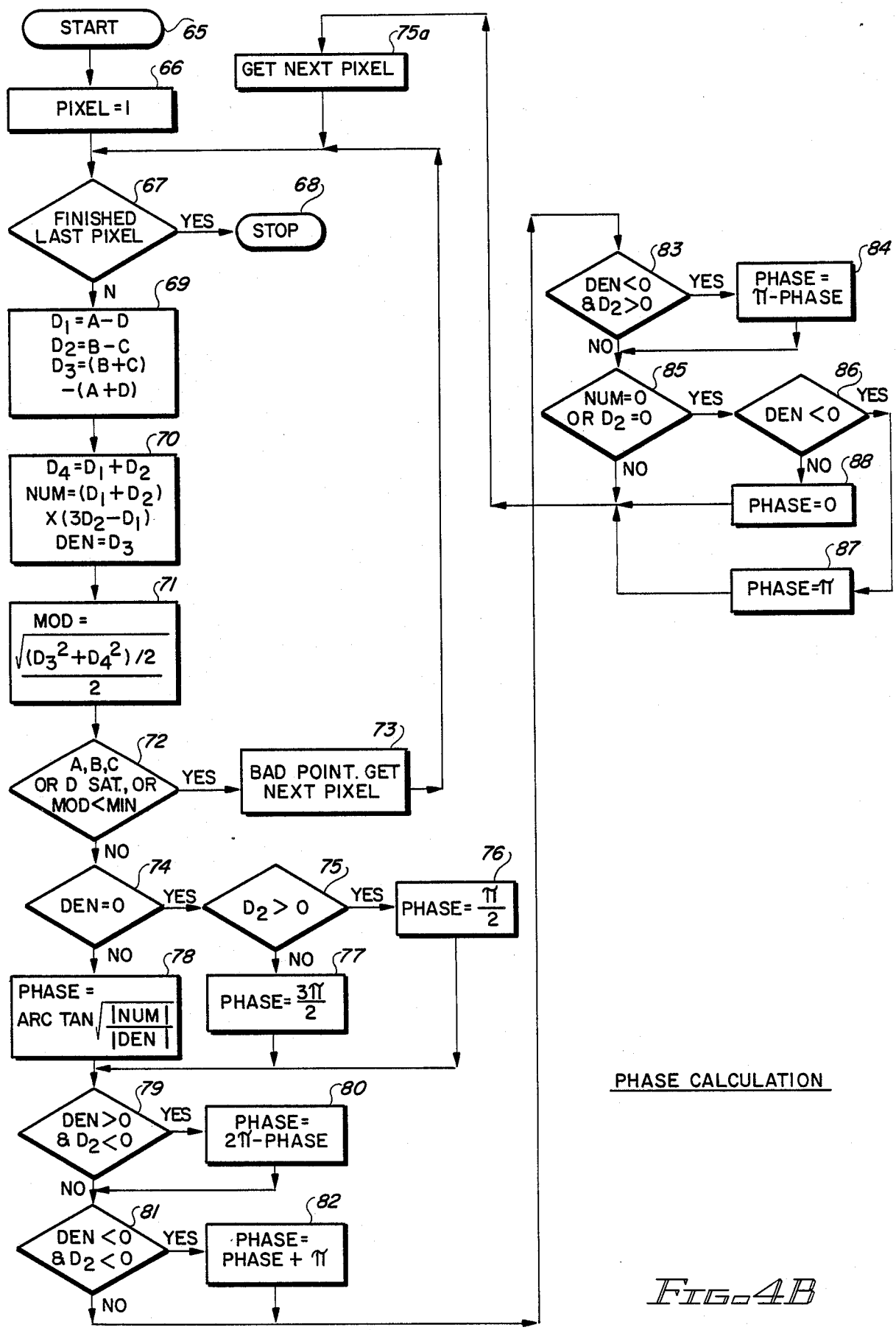

Referring now to FIG. 4B, the subroutine for computing the phases, as explained above with reference to block 56, is entered at label 65. First, the program sets a variable called PIXEL to 1. The program then goes to decision block 67 and determines if the present value of PIXEL is equal to $256^2$ (assuming that a 256 by 256 photodetector array is being used).

If the determination of block 67 is affirmative, the algorithm is exited at label 68. Otherwise, the program goes to block 69 and computes the temporary variables $D_1$, $D_2$, and $D_3$ as illustrated. The program then goes to block 70 and computes the temporary variables $D_4$, NUM (numerator), and DEN (denominator).

The algorithm then goes to block 71 and computes the quantity MOD (modulation), which is equivalent to equation (7) above.

Next, the program goes to decision block 72 and determines if any of A, B, C, or D has a value that exceeds a predetermined "saturation" level that indicates too much incident light on the corresponding photodetector, or if the modulation variable MOD is less than a predetermined minimum threshold. If the determination of block 72 is affirmative, the program goes to block 73 and determines that the data from the present pixel or photodetector is invalid by setting a flag corresponding to that pixel of the photodetector array, so that it can be later recognized as a bad point, increments PIXEL, and returns to decision block 67. If the determination of block 72 is negative, the program goes to decision block 74 and determines if DEN is equal to zero. If the determination of decision block 74 is affirmative, the program goes to decision block 75 and determines if the variable $D_2$ is greater than zero. If DEN is 0, then the phase has certain values meaning that the arctangent has become infinite, so depending on the sign of the sine term, the phase is given a value of $\pi/2$ or $3\pi/2$, as indicated in blocks 76 and 77.

Referring to block 78, since an arctangent calculation will only give a phase modulo $\pi$ because of the signs in the numerator and denominator of the equation, an ambiguity can occur there. Absolute values of NUM and DEN are computed to avoid this.

In blocks 79 through 85 it is determined in which cartesian coordinate quadrant 2, 3, or 4 to place the phase. Then $\pi$ added to the phase or the phase is subtracted from $2\pi$ or $\pi$, as indicated. The final part of this calculation is to check if the numerator is equal to 0 in block 85. If the numerator is equal to 0, then the phase is set to either 0 or $\pi$ depending on whether the denominator is less than or greater than 0. At that point, the program goes to block 75A and increments PIXEL.

Note that Appendix A, affixed hereto, includes a printout of an operating program executed by computer 40 and including the calculations corresponding to the flow charts of FIGS. 4A and 4B.

The three dimensional countour map shown in FIG. 3A was obtained for the two-wavelength technique described above, while the corresponding contour map of FIG. 3B was obtained using only the single-wavelength $\lambda_a$. The technique described above with reference to equation 6 could be used to correct all of the obvious errors in FIG. 3B to provide a contour map resembling, but more accurate than, the contour map of FIG. 3A.

The fundamental limit to the above-described technique is the ratio of detector size to the fringe spacing. If many fringes are incident upon a single detector element, the intensity measured will, in effect, be an "average" over the detector area. Then, when the phase is shifted by the piezoelectric transducer 19, such points, or more particularly, the measured intensities or photocurrents, will not be "modulated" (i.e., change from one intensity measurement to the next as the phase is shifted by the motion of the piezoelectric transducer) sufficiently to allow an accurate phase computation to be made.

To avoid this problem, the size of the detector should be small compared to the $\lambda_a$ and $\lambda_b$ fringe spacing to ensure sampling of one fringe at a time as the phase is shifted by motion of the piezoelectric transducer. We are experimenting with holes 2, 5, and 10 microns in diameter in order to obtain a suitable trade off between accuracy of computation and loss of light received by the individual photodiodes.

The sensitivity of two-wavelength phase-shifting interferometry is limited by the equivalent wavelength used. Since single-wavelength phase-shifting interferometry is generally precise to $\lambda_a/100$ to $\lambda_a/1000$, the above described technique should measure surface defects of the order of 100 to 1000 angstroms for an equivalent wavelength $\lambda_{eq}$ equal to 10 microns or 10 to 100 angstroms after correcting ambiguities in the single wavelength data.

One technique for reducing the ratio between the effective photodetector area (size of pixel) and the distance between "equivalent" fringes is to utilize a mask plate 43, shown in FIG. 5A. Mask plate 43 includes an array of minute holes 44 that are centered over and aligned with each of the photodetector array elements in array 29A. Unfortunately, this technique reduces the amount of light that reaches the photodetector cells, reducing the photocurrents produced by each, possibly resulting in an undesirable reduction in accuracy. To offset the reduction in photocurrents produced by the interference pattern focused by the optics onto the detector array 29A, either more laser power is needed, or else a light intensifier device 46 can be mounted between mask plate 43 and the detector array 29A, FIG. 5B, and a fiberoptic bundle 45 can be aligned with and positioned between the intensifier 46 in the detector array 29A, as also shown in FIG. 5B, preventing further loss of light rays. Various suitable image intensifiers are commercially available, for example from ITT or Litton. Such intensifiers have a photocathode which responds to incident light followed by a microchannel plate which intensifies the signal, whose output activates a phosphor, producing larger amounts of light.

It should be appreciated that in using phase-shifting interferometry techniques, if the light signal falling on a particular photodetector cell is low for any reason, or if for some reason one of the two interferometer beams is much brighter than the other, there can be a considerable inaccuracy in the computed phase and optical path difference for that photodiode. As far as we know, no one has published a really good technique for determining whether or not the phase computations are accurate or inaccurate as a result of too low light intensity or saturation of a particular photodetector cell. In the past, we have compared the intensity measurements from adjacent photocells, and eliminated data points corresponding to photocells from which the measured intensity varies less than a preselected amount from that of the previously scanned photocell. As mentioned previously, this technique results in accidental discarding of a considerable amount of good data, reducing the accuracy of the overall countour map of the aspheric surface 25.

In accordance with a further aspect of the present invention, the following equation is utilized to compute the fringe modulation, or contrast:

$$\gamma = \sqrt{I_1 I_2} = \frac{1}{2} \frac{\sqrt{[(B-C)+(A-D)]^2 + [(B+C)-(A+D)]^2}}{2} \quad (7)$$

This expression is easily derived from the above Carre equations (equations 10) of the Creath et al., assuming that the phase-shift is close to $\pi/2$. The quantity $\gamma$ is the constant preceding the cosine terms in the above mentioned equations for A, B, C, and D of the above mentioned Carre' equations. Thus, $\gamma$ is the amplitude of the variation of the quantities A, B, C, and D, and can be interpreted as the contrast of the interference fringes. We have found that if the fringe contrast is less than an experimentally determined threshold value, which depends on the ambient level of electrical noise and the amount of intrinsic photodetector junction noise, the accuracy of the phase plots and/or contour plots obtained is increased considerably over that previously available using prior techniques for eliminating bad data points.

It should be noted that chromatic aberration of interferometers can be minimized by proper design thereof. First, beam splitter 16 can be a membrane beam splitter called a pellicle. The microscope objective collimating lens combination 12 and 14, lens 23, and lens 27 all should be designed so that they are achromatic at the wavelengths $\lambda_a$ and $\lambda_b$. This means that the design is such that the image of the aspheric test surface is the same size and location for both $\lambda_a$ and $\lambda_b$.

While the invention has been described with reference to several particular embodiments thereof, those skilled in the art will be able to make various modifications to the described embodiments of the invention without departing from the true spirit and scope thereof. For example, there may be various techniques for computing the $\lambda_{eq}$ at each detector without computing the phase for that detector at each of the two wavelengths, and instead computing $\phi_{eq}$ from the intensity measurements of that detector at each wavelength.

Such techniques nevertheless would distinguish over the Cheng and Wyant reference by providing computation of $\phi_{eq}$ at each detector point independently of the values computed for the other detector points, and thereby avoid the accumulation of any errors due to electronic noise, PN junction noise, or round-off errors at the other detector points.

Although an array of photodetectors is disclosed, it would be possible to instead use a single detector and means for providing relative movement between a single detector and the interferogram to accomplish the intensity measurements.

It should be appreciated that those skilled in the art can derive a variety of expressions for $\phi_{eq}$ as a function of the intensities measured at each of the two wavelengths $\lambda_a$ and $\lambda_b$ that do not involve computing $\phi_a$ and $\phi_b$. Such expressions can be derived from the above-mentioned Carre' equations or from various other equations representing intensities of the interferogram at different phase shifts that are known to those skilled in the art. It should be appreciated that equation (7) will be different for each different mathematical technique for computing phase. It also should be noted that various other techniques for obtaining phase shifts can be accomplished other than by shifting the reference mirror. Appendix 2 provides an example of such a derivation.

APPENDIX 1

Pascal procedure to do two-wavelength phase-shifting interferometry

{-------------------------------------------------------------------}

```
procedure measure_phase;

const
    badpix=2147483647;

var
    lineout              :strng;
    mask_a,mask          :bytary_ptr;
    mask_e               :bytary_ptr;
    phase_a,phase_b      :pointer1;
    phase_c,phase_d      :pointer1;
    phase_e,phase_f      :pointer1;
    phase_g,phase_h      :pointer1;
    shift_1,shift_2      :pointer1;
    sumphs               :pointer2;
    i,j,take             :integer;
    garbage              :string[106];
    row,col,kount        :integer;
    dummy,ch,window_type :char;
    factor               :real;
    buf_q1,buf_q2        :pointer10;
    imin,imax            :integer;
    device,cnt           :integer;
    shft1,shft2          :integer;
    integrate,operation  :char;
    done_processing_phase:boolean;
    incorrect            :boolean;
    change_display       :boolean;
    magnification        :integer;
    lambda1,lambda2      :real;
```

```
   xloc,yloc              :array [1..4] of integer;
   jump,prev_jump          :integer;

BEGIN
mark(buf_q1);
new(phase_a);
new(phase_b);
new(phase_c);
new(phase_d);
new(phase_e);
new(phase_f);
new(phase_g);
new(phase_h);
new(shift_1);
new(shift_2);
new(sumphs);
new(mask_a);
new(mask_e);
new(mask);

device:= {701:2} 2;
systime(time);
sysdate(date);
label_output; {procedure to put together label line}
graphics_init;
display_init(display_address, control_word, error_return);

{set grey scale}
{for i:=0 to 15 do
   set_color_table(i,i/15,i/15,i/15);}
{set_color_table(15,1,0,0);} lambda1:=0.6328;
lambda2:=0.4880;

{process raw phase data from Carre eqs.}
   operation:='d';
   change_display:=false;
   done_processing_phase:=false;
   repeat {until done_processing_phase}
     writeln(#12);
     writeln('INPUT DESIRED OPERATION');
     writeln;
     writeln('D : change display');
     writeln('N : set noise value');
     writeln('I : integrate');
     writeln('M : median window');
     writeln('F : final phase to disk');
     writeln('G : data from disk');
     writeln('O : one wavelength');
     writeln('Z : get data for correction: 2-1');
     writeln('C : correct one wavelength');
     writeln('Q : quit');
     incorrect:=false;
     gotoxy(0,22);
     case operation of
       'D','d': begin {change display}
               clear_display;
               if change_display=true
                  then change_display:=false
               else change_display:=true;
               if change_display=true then
                  begin
                    magnification:=2;
                    xloc[1]:= 10; yloc[1]:=  5;
                    xloc[2]:=270; yloc[2]:=  5;
                    xloc[3]:= 40; yloc[3]:=180;
                    xloc[4]:=300; yloc[4]:=180
                  end
```

```
              else
                begin
                  magnification:=3;
                  xloc[1]:=100; yloc[1]:=50;
                  xloc[2]:=100; yloc[2]:=50;
                  xloc[3]:=100; yloc[3]:=50;
                  xloc[4]:=100; yloc[4]:=50
                end;
            end;
'N','n': begin {remove noise}
           {check_modulation(phase_in,modulation,phase_out,mask);}
           writeln('enter noise threshold');
           readln(noise);
           check_modulation(phase_b,phase_c,shift_1,mask_a);
           check_modulation(phase_f,phase_g,shift_2,mask_e);
           sub_phases(shift_1,shift_2,phase_a,mask_a,mask_e,
                      grid_size2,j);
           reset_phase(phase_a,phase_d,grid_size2);
           writeln;
           gotoxy(0,21);
           writeln('no. pixels removed using Carre eqs.----------',j:3);
           display_phase(phase_a,phase_h,grid_size2,
                         xloc[1],yloc[1],magnification,5)
         end;
'I','i': begin {integrate 2-pi ambiguities}
           integ_rows(phase_a);
           integ_columns(phase_a);
           scale_display_phase(phase_a,phase_h,max_phase,
                               grid_size2,xloc[4],yloc[4],
                               magnification,4)
         end;
'M','m': begin {median window on array phase_a}
           writeln('median window type?');
           read(keyboard,window_type);
           reset_phase(phase_a,phase_h,grid_size2);
           median_window(phase_h,phase_a,window_type);
           scale_display_phase(phase_a,phase_h,max_phase,
                               grid_size2,xloc[4],yloc[4],
                               magnification,4)
         end;
'F','f': {write phase to disk}
         store_frame_on_disk(phase_a);
'G','g': begin {read raw data and modulations from disk}
           {raw phases}
           read_frame_from_disk(phase_b);
           read_frame_from_disk(phase_f);
           {modulations}
           read_frame_from_disk(phase_c);
           read_frame_from_disk(phase_g);
         end;
'O','o': begin {one wavelength}
           writeln('enter noise threshold');
           readln(noise);
           check_modulation(phase_b,phase_c,shift_1,mask_a);
           reset_phase(shift_1,phase_a,grid_size2);
           reset_phase(phase_a,phase_d,grid_size2);
           display_phase(phase_a,phase_h,grid_size2,
                         xloc[1],yloc[1],magnification,4)
         end;
'Z','z': begin {read raw 1 wavelength data and integrated
                       2 wavelength data from disk} clear_display;
           writeln(#12,'read in A) two-wave integrated phase');
           writeln('          corrected for chromatic aberration');
           writeln('          followed by ....');
           writeln('       B) one-wave integrated phase');
           writeln;
           writeln;
           writeln('press enter to continue');
```

```
                readln(pause);

{two wave integrated and corrected phase}
                read_frame_from_disk(phase_a);
                scale_display_phase(phase_a,phase_h,max_phase,
                                    grid_size2,xloc[1],yloc[1],
                                    magnification,4);

{one wave integrated phase}
                read_frame_from_disk(phase_b);
                scale_display_phase(phase_b,phase_h,max_phase,
                                    grid_size2,xloc[2],yloc[2],
                                    magnification,4);

end;
      'C','c': begin {correct 2-pi ambiguities in single wavelength data}
                 correct_rows(phase_a,phase_b);
                 onetwo(phase_b^,phase^,grid_size2);
                 profile_surface;

writeln('want to correct columns too? - (y or n)');
                 read(keyboard,ch);
                 if (ch='y') or (ch='Y') then
                   begin
                     correct_columns(phase_b);
                     onetwo(phase_b^,phase^,grid_size2);
                     profile_surface;
                   end;

reset_phase(phase_b,phase_a,grid_size2);
               end;
    otherwise
       incorrect:=true;
    end;
  gotoxy(0,22);

if not done_processing_phase then
    begin
      if incorrect then writeln ('INCORRECT INPUT --- try again')
                   else writeln ('NEXT OPERATION ?           ')
    end;
  read(keyboard,operation);
  if (operation='q') or (operation='Q') then
    done_processing_phase:=true
  until done_processing_phase;

clear_display;
release(buf_q1);

end; {measure_phase}
{correct rows of one-wave integrated data by comparing to two-wave
     integrated data which has been corrected for chromatic aberration}
procedure correct_rows(phase2:pointer1;var phase1:pointer1);

var
  i,j,index,diff,jump,integ,old_diff   : integer;
  n,col_diff,k             : integer;
  first                    : boolean;

begin
  writeln(#12,'correcting rows of integrated one-wavelength data');
  n:=255;

{rows}
  first:=true;
  for j:=2 to grid_size do
    begin
      index:=(j-1)*grid_size;
```

```
      if first then
        {the first good row}
        begin
          for i:=2 to grid_size do
            begin
              if (phase2^[i-1+index]<max_phase) and
                 (phase2^[i+index]<max_phase) then
                begin
                  old_diff:=phase2^[i-1+index]-phase1^[i-1+index];
                  diff:=phase2^[i+index]-phase1^[i+index];
                  jump:=diff-old_diff;
                  integ:=n*round(jump/n);
                  phase1^[i+index]:=phase1^[i+index]+integ;
                end
              else
                begin
                  if (first=true) and (phase2^[i+index]<max_phase) then
                    first:=false;
                  phase1^[i+index]:=phase2^[i+index];
                end;
            end;
        end else
        {every other row}

{find first good point on row}
        begin
          k:=1;
          repeat
            phase1^[k+index]:=max_phase;
            k:=k+1;
          until (k=grid_size) or
                ((phase2^[k-grid_size+index]<max_phase) and
                 (phase2^[k+index]<max_phase));

{first point on row}
          old_diff:=phase2^[k-grid_size+index]-phase1^[k-grid_size+index];
          diff:=phase2^[k+index]-phase1^[k+index];
          jump:=diff-old_diff;
          integ:=n*round(jump/n);
          phase1^[k+index]:=phase1^[k+index]+integ;

{rest of row}
          for i:=k+1 to grid_size do
            begin
              if (phase2^[i-1+index]<max_phase) and
                 (phase2^[i+index]<max_phase) then
                begin
                  old_diff:=phase2^[i-1+index]-phase1^[i-1+index];
                  diff:=phase2^[i+index]-phase1^[i+index];
                  jump:=diff-old_diff;
                  integ:=n*round(jump/n);
                  phase1^[i+index]:=phase1^[i+index]+integ;
                end
              else
                phase1^[i+index]:=phase2^[i+index];
            end;
        end;
    end;

end; {procedure correct_rows}

{after correct_rows, this will fix isolated points which are off by mult
    due to noise in two-wave data.  This is done by looking at the second
    derivative of the wavefront}
procedure correct_columns(var phase1:pointer1);
```

```
var
   i,j,index,diff,jump,integ,old_diff   : integer;
   n,half_n        : integer;

begin
   writeln(#12,'correcting columns of integrated one-wavelength data');
   n:=255;
   half_n:=round(n/2);

{columns}
   for i:=2 to grid_size do
     begin
       integ:=0;
       diff:=0;
       for j:=2 to grid_size do
         begin
           index:=(j-1)*grid_size;
           if (phase1^[i-grid_size+index]<max_phase) and
              (phase1^[i+index]<max_phase) then
             begin
               diff:=phase1^[i+index]-phase1^[i-grid_size+index]+integ;
               jump:=diff-old_diff;

if jump<-half_n then
                 integ:=integ+n;
               if jump>half_n then
                 integ:=integ-n;

if i=80 then
                 writeln('i ',i+index:5,
                         ' : 1 ',phase1^[i+index]:5,
                         ' : od ',old_diff:5,
                         ' : d1 ',diff:5,
                         ' : dd 1 ',jump:5,
                         ' : int ',integ:6,
                         ' : aft ',phase1^[i+index]+integ:5);
                         ' : int ',integ:6,
                         ' : aft ',phase1^[i+index]+integ:5);

phase1^[i+index]:=phase1^[i+index]+integ;
               old_diff:=phase1^[i+index]-phase1^[i-grid_size+index];
             end;
         end;
     end;                                              Pg. 7

{blank out first column}
   for j:=2 to grid_size do
     phase1^[3+(j-1)*grid_size]:=max_phase;

end;   {procedure correct_columns}

{-------------------------------------------------------------------------} procedure sub_phases(phase_1,phase_2,phase_out: pointer1;
                     mask_1,mask_2: bytary_ptr;
                     size: integer;
                     var num_badpix: integer);
var
   i,j,k                : integer;

begin
   {subtract 2 sets of phase data}
   num_badpix:=0;
   j:=0; k:=0;
   for i:=1 to size do
     if (mask_1^[i]=0) or (mask_2^[i]=0) then
       begin
         if mask_1^[i]=0 then j:=j+1;
         if mask_2^[i]=0 then k:=k+1;
         num_badpix:=num_badpix+1;
```

```
        mask_1^[i]:=0;
        phase_out^[i]:=32767
      end
    else
      phase_out^[i]:=(phase_2^[i] - phase_1^[i])+255;
  writeln('no. bad pixels in phase 1  ',j:5,'   in phase 2 ',k:5);
  writeln; writeln;
end; {procedure sub_phases}
{---------------------------------------------------------------------} procedure check_modulation(phase_in,modulation: pointer1;
                           var phase_out: pointer1; mask: bytary_ptr);

var
  i,int_min                : integer;

begin
  int_min:= noise  (2*(noise*noise));
  for i:=1 to grid_size2 do
    begin
      if (phase_in^[i]=max_phase) or
         (modulation^[i]<int_min) then
        begin
          mask^[i]:=0;
          phase_out^[i]:=max_phase
        end
      else
        begin
          {reset mask} mask^[i]:=1;
          phase_out^[i]:=phase_in^[i];
        end
    end
end; {procedure check_modulation}

{---------------------------------------------------------------------} procedure integ_columns(var p_a:pointer1);
  {take care of 2 PI ambiguities in colur .s}
  {should already have integrated rows}
  {start in middle of column and work up and then down} var
    Integ,i,j,k,dir,phase_old1,
    phase_old,difference,
    mid,step,scale,scale2,
    index,index_first            : integer;

begin
    scale:=255(mult);
      {360 deg corresponds to a phase of scale}
      {mult previously defined as units per wave}
    scale2:=round(1.0*scale/2);
    mid:=round(grid_size/2);
    for j:=1 to grid_size do
      begin k:=mid;
        index:=(k-1)*grid_size;
        repeat
          phase_old1:=p_a^[index+j];
          k:=k+1;
          index:=index+grid_size;
        until (phase_old1<max_phase) or
              (k>grid_size) or (k<1);
        until (phase_old<max_phase or
              (k>grid_size) or (k<1);
```

```
          index_first:=index;
          if (k<=grid_size) and (k>=1) then
            begin for dir:=1 to 2 do
                 begin
                   {dir=1 working up}
                   {dir=2 working down}
                    phase_old:=phase_old1;
                    index:=index_first;
                    i:=k;
                    integ:=0;
                    if dir=1 then
                       step:=1 {working way up}
                    else
                       step:=-1; {working way down} repeat
                    if p_a^[index+j]<max_phase then
                      begin
                         difference:=p_a^[index+j]-phase_old;
                         phase_old:=p_a^[index+j];

if (difference<-scale2) then
                           begin
                              integ:=integ+scale;
                           end
                         else
                           begin
                              if (difference>scale2) then
                                 begin
                                    integ:=integ-scale;
                                 end;
                           end;

p_a^[index+j]:=p_a^[index+j]+integ;
                      end; {if phase^} if dir=1 then
                       index:=index+grid_size
                          {working way up}
                    else
                       index:=index-grid_size;
                          {working way down} i:=i+step;
                    until (i>grid_size) or (i=0);
                 end; {for dir} end; {if}
      end; {for j} end; {integ_columns} procedure integ_rows(var p_a:pointer1);
    {take care of 2 PI ambiguities in rows} var
    Integ,i,j,k,dir,phase_old1,i1,
    phase_old,difference,
    mid,step,scale,scale2        : integer;

begin
    scale:=255{mult};
       {360 deg corresponds to a phase of scale}
       {mult previously defined as units per wave}
```

```
    scale2:=round(1.0*scale/2);
    mid:=round(grid_size/2);
    for i:=1 to grid_size do
      begin
        k:=mid;
        i1:=(grid_size)*(i-1);
        repeat
          phase_old1:=p_a^[i1+k];
          k:=k+1;
        until (phase_old1<max_phase) or
              (k>grid_size) or (k<1);

if (k<=grid_size) and (k>=1) then
          begin for dir:=1 to 2 do
              begin
                {dir=1 working right}
                {dir=2 working left}
                phase_old:=phase_old1;
                j:=k;
                integ:=0;
                if dir=1 then
                  step:=1 {working way right}
                else
                  step:=-1; {working way left} repeat
                if p_a^[i1+j]<max_phase then
                  begin
                    difference:=p_a^[i1+j]-phase_old;
                    phase_old:=p_a^[i1+j];

if (difference<-scale2) then
                      begin
                        integ:=integ+scale;
                      end
                    else
                      begin
                        if (difference>scale2) then
                          begin
                            integ:=integ-scale;
                          end;
                      end;

p_a^[i1+j]:=p_a^[i1+j]+integ;
                  end; {if phase^} j:=j+step;
                until (j>grid_size) or (j=0);
              end; {for dir} end; {if}
      end; {for i} end; {integ_rows} procedure profile_surface; {plot profile of surface heights}
label 1;
var
  valley_mul,button,ierr,j,
  y1,i,x1,old_button,ch,
  bx,blx,by,bly,be,ble,
  level,win_max,win_min,bc,blc   : integer;

pv,x,y,xmin,xmax,ymin,
  ymax,xlength,ylength,
  yold,xold,y_profile,
  y_opd,y_xy,yy,
  contour_step,profile_length,hei: real;
  old_x,old_y,cplot,menu2        : boolean;
```

```
    s,level_text                    : string[20];
    pl                              : integ_short;
    num_levels,ystep,yint,po        : integer;

begin
  cplot:=true;
  profile_length:=2;
  if color_hp then
    begin
      num_levels:=15;
      ystep:=-6;
      yint:=45;
    end
  else
    begin
      num_levels:=7;
      ystep:=-10;
      yint:=35;
    end;

win_min:=-50;
  win_max:=win_min+grid_size-1;
  {---------------------------------------------}
  {possible button values}
  bc:=ord('c');
  blc:=ord('C');
  bx:=ord('x');
  blx:=ord('X');
  by:=ord('y');
  bly:=ord('Y');
  be:=ord('e');
  ble:=ord('E');
  {---------------------------------------------} rms:=0.0;
  peak:=-32767;
  valley:=32767;
  for i:=1 to grid_size do
    for j:=1 to grid_size do
      begin
        if (phase^[i,j]> peak) and
           (phase^[i,j]<max_phase)   then peak:=phase^[i,j];
        if phase^[i,j]< valley then valley:=phase^[i,j];
      end;
  peak:=peak/mult;
  valley:=valley/mult;

pv:=1.0001*(peak-valley)*mult;
  valley_mul:=round(valley*mult);
  header(false);
  move(-1.65*50,1.2*50);
  rms_pv:=' Rms:                       P-V:           ';
  STRWRITE(rms_pv,7,CH,rms:1:3);
  STRWRITE(rms_pv,34,CH,peak-valley:1:3);
  gtext(rms_pv);

{---------------------------------------------}
  {draw 2d contour map} set_aspect(512,390);
  set_window(-1,1,-1,1);
  SET_CHAR_SIZE(0.035,0.07);
  contour_step:=(peak-valley)/num_levels;
  FOR I:=1 TO num_levels do
    begin
      if i<5 then
        move (-0.95,-0.10*I+0.6);
      if (i)=5) and (i<=8) then
        move (-0.65,-0.10*I+1.0);
```

```
       if (i>=9) and (i<=12) then
          move (-0.95,-0.10*I+0.28);
       if (i>12) then
          move (-0.65,-0.10*I+0.68);
       level:=num_levels-i+1;
       set_color(level);
       level_text:='         ';
       hei:=valley+i*pv/(num_levels*mult);
       if hei<0 then
          po:=1
       else
          po:=2;
       STRWRITE(level_text,po,CH,hei:3:3);
       gtext(level_text);
    end;

set_aspect(1.0,1.0);
  if color_hp then
     set_display_lim(2.8,62.3,36.3,95,ierr)
  else
     set_display_lim(2,44,26,68,ierr);

set_window(win_min,win_max,win_min,win_max);

dd_contour(pv,valley_mul,phase,false);
  {---------------------------------------------}

{draw axes for profile and label profile} xmin:=-1.0;
  xmax:=grid_size+1.0;
  if peak>abs(valley) then
     yy:=peak*mult
  else
     yy:=abs(valley)*mult;
  ymin:=-1.02*yy;
  ymax:=1.02*yy;
  xlength:=xmax-xmin;
  ylength:=ymax-ymin;

set_aspect(512,390);
  if color_hp then
     set_display_lim(0,217,0,163,ierr)
  else
     set_display_lim(0,153.3,0,116.7,ierr);

set_viewport(0.45,0.95,0.15,0.45);{-5}
  set_color(1);
  set_window(xmin,xmax,ymin,ymax);
  frame(xmin,xmax,ymin,ymax);
  axes(xmin,xmax,ymin,ymax,xlength/5,ylength/8,
              xmin,ymin,100,60);

{label x and y axes}
  set_color(1);
  set_char_size(0.036*xlength,0.09*ylength);
  move(xmin-xlength/40,ymin-0.125*ylength);
  gtext('0');
  for i:=1 to 5 do
    begin
      move(xmin+(i-0.25)*xlength/5,ymin-0.125*ylength);
      s:=' ';
      strwrite(s,1,ch,(i*(profile_length-1)/5):1:1);
      gtext(s);
    end;
  move(xmin+0.75*xlength/5,ymin-0.28*ylength);
  gtext(' Distance on surface');

for i:=0 to 4 do
    begin
```

```
        move(xmin-0.25*xlength,ymin+i*ylength/4-
                               ylength/40);
        s:=' ';
        if valley+i*pv/(mult*4)<0 then
          strwrite(s,1,ch,ve__..+i*pv/(mult*4):2:3)
        else
          strwrite(s,2,ch,valley+i*pv/(mult*4):2:3);
        gtext(s);
    end;

{-----------------------------------------------}
{write text at top of profile plot} set_color(1);
  set_char_size(0.042*xlength,0.09*ylength);
  set_char_size(0.036*xlength,0.09*ylength);
  y_profile:=1.1*ymax;
  move(10,y_profile);
  gtext(' profile');

y_opd:=1.35*ymax;
  move(10,y_opd);
  s:='OPD =';
  gtext(s);

y_xy:=1.52*ymax;
  move(10,y_xy);
  s:='x =       y =   ';
  gtext(s);

{-----------------------------------------------}
  x1:=1;
  set_color(1);
  locator_init(2,error_   urn);
  x:=0;
  y:=0;
  xold:=x;
  yold:=y;
  old_x:=true;
  old_y:=false;
  button:=bx;

menu2:=false;
  {writeln(#12);}
  gotoxy(30,24);
  write('Hit space bar for MENU');
  gotoxy(80,24);

repeat
    set_aspect(512,390);
    if color_hp then
      set_display_lim(0,217,0,163,ierr)
    else
      set_display_lim(0,153.3,0,116.7,ierr);
    set_viewport(0.45,0.95,0.15,0.45);
    set_window(xmin,xmax,ymin,ymax);

{-----------------------------------------------}
  {erase old x and y coordinates and OPD value}
  set_color(0);
  move(25,y_xy);
  s:=' ';
  strwrite(s,1,ch,x1:1);
  gtext(s);

move(60,y_xy);
  s:=' ';
  strwrite(s,1,ch, ..i');
  gtext(s);
```

```
         move(33,y_opd);
         s:=' ';
         strwrite(s,1,ch,
                  (phase^[y1,x1])/mult:4:3);
      gtext(s);

{------------------------------------------}
      {erase old graph}
      if old_x then
         begin
            set_color(0);
            move(10,y_profile);
            gtext('X');
            move(x1,yy);
            line(x1,-yy);

if phase^[y1,1] <> max_phase then
               int_move(1,phase^[y1,1]);

i:=1;     {start from 1 in case first pixel is bad}
            repeat
              p1:=phase^[y1,i];
              if p1<>max_phase then
                 int_line(i,p1)
              else
                 begin
                    while (p1=max_phase) and (i<grid_size) do
                      begin
                         i:=i+1;
                         p1:=phase^[y1,i]
                      end;
                    if p1 <> max_phase then   {in case last pixel is bad}
                       int_move(i,p1)
                 end;
              i:=i+1;
            until i>grid_size;
         end;

if old_y then
      begin
         set_color(0);
         move(10,y_profile);
         gtext('Y');
         move(y1,yy);
         line(y1,-yy);

if phase^[1,x1] <> max_phase then
            int_move(1,phase^[1,x1]);

i:=1;{start from 1 in case first pixel is bad}
         repeat
           p1:=phase^[i,x1];
           if p1<>max_phase then
              int_line(i,p1)
           else
              begin
                 while (p1=max_phase) and (i<grid_size) do
                    begin
                       i:=i+1;
                       p1:=phase^[i,x1]
                    end;
                 if p1 <> max_phase then   {in case last pixel is bad}
                    _move(i,p1)
              end;
           i:=i+1;
         until i>grid_size;
      end;

{------------------------------------------}
```

```
{write new x and y coordinates and OPD value} xold:=x;
x1:=round(x+1-win_min); {x position in data array}
yold:=y;
y1:=round(y);
y1:=round(y+1-win_min); {y position in data array} set_color(1);
move(25,y_xy);
s:=' ';
strwrite(s,1,ch,x1:1);
gtext(s);

move(60,y_xy);
s:=' ';
strwrite(s,1,ch,y1:1);
gtext(s);

move(33,y_opd);
s:=' ';
strwrite(s,1,ch,
       (phase^[y1,x1])/mult:2:3);
gtext(s);

{------------------   --------------------}

{plot new data}
if  (button=bx) or (button=blx)
          then
    begin
    old_x:=true;
    old_y:=false;
    set_color(2);
    move(x1,yy);
    line(x1,-yy);
    set_color(1);
    move(10,y_profile);
    gtext('X');
    set_color(3);

if phase^[y1,1] <> max_phase then
       int_move(1,phase^[y1,1]);

i:=1;{start from 1 in case first pixel is bad}
    repeat
      p1:=phase^[y1,i];
      if p1<>max_phase then
        int_line(i,p1)
      else
        begin
          while (p1=max_phase) and (i<grid_size) do
            begin
              i:=i+1;
              p1:=phase^[y1,i]
            end;
          if p1 <> max_phase then   {in case last pixel is bad}
             int_move(i,p1)
        end;
      i:=i+1;
    until i>grid_size;
    end;

if  (button=by) or (button=bly)
          then
    begin
    old_y:=true;
    old_x:=false;
    set_color(2);
```

```
      move(y1,yy);
      line(y1,-yy);
      set_color(1);
      move(10,y_profile);
      gtext('Y');
      set_color(3);

if phase^[1,x1] <> max_phase then
          int_move(1,phase^[1,x1]);

i:=1;  {start from 1 in case first pixel is bad}
      repeat
        p1:=phase^[i,x1];
        if p1<>max_phase then
          int_line(i,p1)
        else
          begin
            while (p1=max_phase) and (i<grid_size) do
                begin
                  i:=i+1;
                  p1:=phase[i,x1]
                end;
            if p1 <> max_phase then   {in case last pixel is bad}
                int_move(i,p1)
          end;
        i:=i+1;
      until i>grid_size;
      end;

set_aspect(1.0,1.0);
if color_hp then
  set_display_lim(2.8,62.3,36.3,95,ierr)
else
  set_display_lim(2,44,26,68,ierr);

set_window(win_min,win_max,win_min,win_max);
set_echo_pos(x,y);

{---------------------------------------}
{obtain new data}

1:await_locator(3,button,x,y);

if (button=bc) or (button=blc) then
  begin
    if (cplot) and (color_hp) then
      begin
        cplot:=false;
        grey_level_color_table;
      end
    else
      begin
        cplot:=true;
        wms_color_table;
      end;
  e if (button=ord(' ')) then
  begin
    if menu2 then
      begin
        menu2:=false;
        {graphics_on;}
        writeln(#12);
        gotoxy(30,24);
        write('Hit space bar for MENU');
        gotoxy(80,24);
      end
```

Pg. 17

```
        else
          begin
            menu2:=true;
            ilist[1]:=0;
            plist[1]:=0;
            output_esc(1050,1,0,ilist,plist,code);
            menu2_display;
          end;
      end;
    end;

if (y=yold) and (x=xold) and
      (button=old_button) then goto 1;

if (button<>bx) and (button<>blx)
     and (button<>by) and (button<>bly)
     ___ /L..aa__/\L_\ ___ /L..aa__/\L1_\ aL__
       goto 1;

if x<win_min then x:=win_min;
       if x>win_max then x:=win_max;
       if y<win_min then y:=win_min;
       if y>win_max then y:=win_max;

old_button:=button;

{-----------------------------------------} until (button=be) or (button=ble);

locator_term;
    writeln(#12);

end; {profile_surface}
```

*To take data and store*

```
procedure measure_phase;

const
    badpix=2147483647;

var
    lineout               :strng;
    mask_a,mask           :bytary_ptr;
    mask_e                :bytary_ptr;
    phase_a,phase_b       :pointer1;
    phase_c,phase_d       :pointer1;
    phase_e,phase_f       :pointer1;
    phase_g,phase_h       :pointer1;
    shift_1,shift_2       :pointer1;
    sumphs                :pointer2;
    i,j,take              :integer;
    garbage               :string[106];
    row,col,kount         :integer;
    dummy,ch,window_type  :char;
    factor                :real;
    buf_q1,buf_q2         :pointer10;
    imin,imax             :integer;
    device,cnt            :integer;
    shft1,shft2           :integer;
    integrate,operation   :char;
    done_processing_phase :boolean;
    incorrect             :boolean;
    change_display        :boolean;
    magnification         :integer;
    lambda1,lambda2       :real;
    xloc,yloc             :array [1..4] of integer;
```

```
BEGIN
  mark(buf_q1);
  new(phase_a);
  new(phase_b);
  new(phase_c);
  new(phase_d);
  new(phase_e);
  new(phase_f);
  new(phase_g);
  new(phase_h);
  new(shift_1);
  new(shift_2);
  new(sumphs);
  new(mask_a);
  new(mask_e);
  new(mask);

device:= {701:2}  2;
  imin:={4956}4956;
  imax:={4960}4960;

lambda1:=0.6328;
  lambda2:=0.4860;

systime(time);
  sysdate(date);
  label_output; {procedure to put together label line} iobuffer(buffer,40000);       {buffer to take four frames}   Pg. 20
  {init sum to all zero's}
  preset(sumphs^,grid_size2,4,0);
  preset(mask^,grid_size2,1,1);

graphics_init;
  display_init(display_address,control_word,error_return);

{set grey scale}
  for i := 0 to 15 do
     set_color_table(i,i/15,i/15,i/15);
  {set_color_table(15,1,0,0);} for take := 1 to numeas do
     begin
     write(#12,chr(133),'Measurement ',take:1,chr(128));

pzt_slope:=cal_slope;
     gpio_initial(1);   {ramp up}
     transfer_phase_data;
     write('.');

{get four intensity frames (first frame is thrown out)}
     frames(buffer.buf_ptr^,phase_a^,phase_b^,phase_c^,phase_d^,grid_size2);
     write('.');

gpio_initial(2);   {ramp down}
     transfer_phase_data;

{exchange 4-bit halves of 8-bit intensity values}
     exgnib(phase_a^,grid_size2);
     exgnib(phase_b^,grid_size2);
     exgnib(phase_c^,grid_size2);
     exgnib(phase_d^,grid_size2);

write('.');

writestringln(device,'');
     writestringln(device,'     I         IA        IB'+
                          '     IC        ID       NUM      DEN ');
     for i:=imin to imax do
       begin
```

```
      strwrite(lineout,1,cnt,i:5,phase_a^[i]:10,phase_b^[i]:10,
              phase_c^[i]:10,phase_d^[i]:10,phase_e^[i]-phase_b^[i]:10,
              phase_a^[i]-phase_b^[i]:10);
      writestringln(device,lineout)
    end;

{pause for user to deform object -- get second set of data}
  write('change from red to blue ');
  pzt_slope:=pzt_slope*lambda2/lambda1;

read(keyboard,ch);

gpio_initial(1);   {ramp up}
  transfer_phase_data;
  write('.');

{get four intensity frames (first frame is thrown out)}
  frames(buffer.buf_ptr^,phase_e^,phase_f^,phase_g^,phase_h^,grid_size2);
  write('.');

gpio_initial(2);  {rampdown}
  transfer_phase_data;

{exchange 4-bit halv  of 8-bit intensity values}
  exgnib(phase_e^,grid_size2);
  exgnib(phase_f^,grid_size2);
  exgnib(phase_g^,grid_size2);
  exgnib(phase_h^,grid_size2);

write('.');

writestringln(device,'');
  writestringln(device,'    I         IE        IF       '+
                '     IG        IH       NUM       DEN ');
  for i:=imin to imax do
    begin
      strwrite(lineout,1,cnt,i:5,phase_e^[i]:10,phase_f^[i]:10,phase_g^[i]:10,
              phase_h^[i]:10,
              phase_g^[i]-phase_f^[i]:10,phase_e^[i]-phase_f^[i]:10);
      writestringln(device,lineout)
    end;

{find phases for both sets of data using Carre's equations}
  writeln('calculating phases');
  phase_cal(phase_a,phase_b,phase_c,phase_d,shift_1,mask);
  phase_cal(phase_e,phase_f,phase_g,phase_h,shift_2,mask);

{---------------------------------------------------------------------}

{get ready to process}
  reset_phase(shift_1,phase_b,grid_size2);
  reset_phase(shift_2,phase_f,grid_size2);
  readln(pause);

{process raw phase data from Carre eqs.}
  operation:='d';
  change_display:=false;
  done_processing_phase:=false;
  repeat {until done_processing_phase}
    writeln(#12);
    writeln('INPUT DESIRED OPERATION');
    writeln;
    writeln('D : change display');
    writeln('N : set noise value');
    writeln('I : integrate');
    writeln('S : smooth');
    writeln('M : median window');
    writeln('R : reset - raw data');
    writeln('W : write data to disk');
    writeln('F : final phase to disk');
```

```
writeln('G : data from disk');
writeln('P : print data & mod');
writeln('O : one wavelength');
writeln('C : correct one wavelength');
writeln('Q : quit');
incorrect:=false;
gotoxy(0,22);
case operation of
  'D','d': begin {change display}
            clear_display;
            if change_display=true
              then change_display:=false
            else change_display:=true;
            if change_display=true then
              begin
                magnification:=2;
                xloc[1]:= 10; yloc[1]:= 5;
                xloc[2]:=270; yloc[2]:= 5;
                xloc[3]:= 40; yloc[3]:=180;
                xloc[4]:=300; yloc[4]:=180
              end
            else
              begin
                magnification:=3;
                xloc[1]:=100; yloc[1]:=50;
                xloc[2]:=100; yloc[2]:=50;
                xloc[3]:=100; yloc[3]:=50;
                xloc[4]:=100; yloc[4]:=50
              end;
          end;
  'N','n': begin {remove noise}
            {check_modulation(phase_in,modulation,phase_out,mask);}
            writeln('enter noise threshold');
            readln(noise);
            check_modulation(phase_b,phase_c,shift_1,mask_e);
            check_modulation(phase_f,phase_g,shift_2,mask_e);
            sub_phases(shift_1,shift_2,phase_a,mask_a,mask_e,
                       grid_size2,j);
            reset_phase(phase_a,phase_d,grid_size2);
            writeln;
            gotoxy(0,21);
            writeln('no. pixels removed using Carre eqs.   = ',j:5);
            display_phase(phase_a,phase_h,grid_size2,
                          xloc[1],yloc[1],magnification,5)
          end;
  'I','i': begin {integrate 2-pi ambiguities}
            integ_rows(phase_a);
            integ_columns(phase_a);
            scale_display_phase(phase_a,phase_h,max_phase,
                                grid_size2,xloc[4],yloc[4],
                                magnification,4)
          end;
  'S','s': begin {smooth data}
            smooth_data(phase_a);
            display_phase(phase_a,phase_h,grid_size2,
                          xloc[2],yloc[2],magnification,5)
          end;
  'M','m': begin {median window on integrated data}
            writeln('median window type?');
            read(keyboard,window_type);
            reset_phase(phase_a,phase_h,grid_size2);
            median_window(phase_h,phase_a,window_type);
            scale_display_phase(phase_a,phase_h,max_phase,
                                grid_size2,xloc[3],yloc[3],
                                magnification,4)
          end;
  'R','r': begin {reset}
            reset_phase(phase_d,phase_a,grid_size2);
          end;
  'W','w': begin {write raw data and modulation to disk}
```

```
                    {raw phases}
                    store_frame_on_disk(phase_b);
                    store_frame_on_disk(phase_f);
                    {modulations}
                    store_frame_on_disk(phase_c);
                    store_frame_on_disk(phase_g);
                  end;
     'F','f': {write phase to disk}
                store_frame_on_disk(phase_a);
     'G','g': begin {read raw data and modulations from disk}
                  {raw phases}
                  read_frame_from_disk(phase_b);
                  read_frame_from_disk(phase_f);

{modulations}
                  read_frame_from_disk(phase_c);
                  read_frame_from_disk(phase_g);
                end;
     'P','p': begin {print phase and modulation}
                for i:=5000 to 5100 do
                  writeln(i:5,' phase_b ',phase_b^[i]:5,
                          ' phase_c ',phase_c^[i]:5,
                          ' rounded ',round(phase_c^[i]/wedge):5);
                end;
     'O','o': begin {one wavelength}
                writeln('enter noise threshold');
                readln(noise);
                check_modulation(phase_b,phase_c,shift_1,mask_a);
                reset_phase(shift_1,phase_a,grid_size2);
                reset_phase(phase_a,phase_d,grid_size2);
                display_phase(phase_a,phase_h,grid_size2,
                              xloc[1],yloc[1],magnification,4)
              end;
     'C','c': begin {correct 2-pi ambiguities in single wavelength data}
                check_modulation(phase_b,phase_c,shift_1,mask_a);
                for i:=1 to grid_size2 do
                  if phase_a^[i]<max_phase then
                    begin
                      phase_a^[i]:=round(phase_a^[i]
                                   *lambda2/abs(lambda1-lambda2))
                    end
                  else phase_a^[i]:=max_phase;

{correct(2-wave,1-wave)}
                scale_display_phase(shift_1,phase_h,max_phase,
                                grid_size2,xloc[3],yloc[3],
                                magnification,4);
                readln(pause);
                correct(phase_a,shift_1);
                {correct_rows(phase_a,shift_1);}
                scale_display_phase(shift_1,phase_h,max_phase,
                                grid_size2,xloc[3],yloc[3],
                                magnification,4);
                {readln(pause);
                correct_columns(phase_a,shift_1);
                reset_phase(shift_1,phase_a,grid_size2);
                scale_display_phase(phase_a,phase_h,max_phase,
                                grid_size2,xloc[3],yloc[3],
                                magnification,4)}
              end;
     otherwise
       incorrect:=true;
   end;
 gotoxy(0,22);

if not done_processing_phase then
   begin
     if incorrect then writeln ('INCORRECT INPUT --- try again')
                  else writeln ('NEXT OPERATION ?             ')
   end;
 read(keyboard,operation);
```

```
      if (operation='q') or (operation='Q') then
         done_processing_phase:=true
      until done_processing_phase;

{add phase_a to sum}
      sum_phase(sumphs^,phase_a^,phase_a^,grid_size2,badpix,max_phase)
   end;
   kount:=0;
   factor:=wedge/numeas;
   for i:=grid_size downto 1  do    {flip top to bottom}
      for j:=1 to grid_size do
         begin
         kount:=kount+1;
         if sumphs^[kount] <> badpix then
            phase^[i,j] := round(sumphs^[kount]*factor)

else
            phase^[i,j] := max_phase end;

clear_display;
   release(buf_q1);

end; {measure_phase}
   Phase calculation using Carre equation
   Includes modulation check procedure phase_cal(a,b: ptr; var c: ptr; d: ptr; var phase: ptr);

var
   i,j,max,min,sat,wave          : integer;
   diff1,diff2,diff3,num,den     : integer;
   int_a,int_b,int_c,int_d       : integer;
   diff4,wave_2,wave_4           : integer;
   mod_min,modulation            : integer;
   sc_factor                     : real;

begin
   {data is 10-bits in, 11-bits out}
   sat:=1023;
   wave:=2048;
   wave_2:=1024;
   wave_4:=512;
   sc_factor:=wave_2/3.14159265;

for i:=1 to gridy do
     for j:=1 to gridx do
       begin
         int_a:=a^[i,j];
         int_b:=b^[i,j];
         int_c:=c^[i,j];
         int_d:=d^[i,j];

diff1:=int_a - int_d;
         diff2:=int_b - int_c;
         diff3:=(int_b + int_c) - (int_a + int_d);
         diff4:=diff1 + diff2;

num:=(diff1 + diff2)*(3*diff2 - diff1);
         den:=diff3;
         modulation:= round(sqrt(abs((diff3*diff3) + (diff4*diff4))/2)/2);
   {*** calculate phase}
      if (int_b=sat) or (int_a=sat) or (int_c=sat) or (int_d=sat)
            or (modulation<mod_min) then
         phase^[i,j]:=badpix*16  {set flag for bad pixel}
```

```
      else {good pixel}
        begin
          {ckeck for division by zero}
          if den=0 then
            if diff2>0 then
              phase^[i,j]:=wave_4
            else
              phase^[i,j]:=3*wave_4
          else
            {quadrant 1}
            phase^[i,j]:=round(arctan(sqrt(abs(num))/abs(den))
                         *sc_factor);

{check den which is proportional to cos(phase),
          and diff2 which is proportional to sin(phase)
             to determine which of 4 phase quadrants to place the pixel}

{quadrant 2}
      if (den>0) and (diff2<0) then
        phase^[i,j]:=wave-1-phase^[i,j];

{quadrant 3}
      if (den<0) and (diff2<0) then
        phase^[i,j]:=phase^[i,j]+wave_2;

{quadrant 4}
      if (den<0) and (diff2>0) then
        phase^[i,j]:=wave_2-1-phase^[i,j];

if (num=0) or (diff2=0) then
        if den<0 then
          phase^[i,j]:=wave_2
        else
          phase^[i,j]:=0;
        end;
      end; {for j to gridx} end; {procedure phase_cal}
```

APPENDIX 2

(1)
$$A = I_o (1 + \gamma\cos(\phi_a)) = I_o (1 + \gamma\cos\phi_a)$$
$$B = I_o (1 + \gamma\cos(\phi_a + \pi/2)) = I_o (1 - \gamma\sin\phi_a)$$
$$C = I_o (1 + \gamma\cos(\phi_a + \pi)) = I_o (1 - \gamma\cos\phi_a)$$
$$D = I_o (1 + \gamma\cos(\phi_a + 3\pi/2)) = I_o (1 + \gamma\sin\phi_a)$$

(2)
$$E = I_o (1 + \gamma\cos(\phi_b)) = I_o (1 + \gamma\cos\phi_b)$$
$$F = I_o (1 + \gamma\cos(\phi_b + \pi/2)) = I_o (1 - \gamma\sin\phi_b)$$
$$G = I_o (1 + \gamma\cos(\phi_b + \pi)) = I_o (1 - \gamma\cos\phi_b)$$
$$H = I_o (1 + \gamma\cos(\phi_b + 3\pi/2)) = I_o (1 + \gamma\sin\phi_b)$$

(3)
$$W = A + E = I_o (2 + \gamma(\cos\phi_a + \cos\phi_b))$$
$$= 2I_o + 2I_o\gamma \cos 1/2(\phi_a+\phi_b)\cos 1/2 (\phi_a-\phi_b)$$

$$(4) \quad X = B-F = I_0\gamma(\sin\phi_a - \sin\phi_b) = -2I_0\gamma\cos 1/2(\phi_a + \phi_b) \times \sin 1/2(\phi_a - \phi_b)$$

$$(5) \quad Y = C+G = 2I_0 - 2I_0\gamma\cos 1/2(\phi_a + \phi_b)\cos 1/2(\phi_a - \phi_b)$$

$$(6) \quad Z = D-H = I_0\gamma(\sin\phi_a - \sin\phi_b)$$
$$= +2I_0\gamma\cos 1/2(\phi_a + \phi_b)\sin 1/2(\phi_a - \phi_b)$$

$$(7) \quad W-Y = 4I_0\gamma\cos 1/2(\phi_a + \phi_b)\cos 1/2(\phi_a - \phi_b)$$

$$(8) \quad Z-X = 4I_0\gamma\cos 1/2(\phi_a + \phi_b)\sin 1/2(\phi_a - \phi_b)$$

$$(9) \quad \tan(1/2\phi_{eq}) = \tan 1/2(\phi_a - \phi_b) = \frac{Z-X}{W-Y}$$

$$(10) \quad \phi_{eq} = 2\arctan\left(\frac{Z-X}{W-Y}\right) = \phi_a - \phi_b$$

$\gamma$ and $I_0$ are normalized to be the same for both $\lambda_a$ and $\lambda_b$. The particular intensity equations are well-known equations that require a 90° phase shift between measurements.

The equations (1) above correspond to four intensity measurements at each detector at a first wavelength $\lambda_a$. Equations (2) represent four corresponding intensity measurements at $\lambda_b$ for the same phase shifts. Equations (3) through (6) show a way of combining equations (1) and (2). Equations (7) and (8) represent a way of combining equations (3) and (6) from which equation (9), for the equivalent phase. Equation (10) shows that $\phi_{eq}$ can be computed without computing $\phi_a$ and $\phi_b$.

γ and $I_o$ are normalized to be the same for both $\lambda_a$ and $\lambda_b$. The particular intensity equations are well-known equations that require a 90° phase shift between measurements.

The equations (1) above correspond to four intensity measurements at each detector at a first wavelength $\lambda_a$. Equations (2) represent four corresponding intensity measurements at $\lambda_b$ for the same phase shifts. Equations (3) through (6) show a way of combining equations (1) and (2). Equations (7) and (8) represent a way of combining equations (3) and (6) from which equation (9), for the equivalent phase. Equation (10) shows that $\phi_{eq}$ can be computed without computing $\phi_a$ and $\phi_b$.

We claim:

1. A method of operating a phase-shifting interferometer, the method comprising the steps of:
   (a) illuminating a reference mirror via a reference arm of the interferometer and illuminating a test surface via a test arm of the interferometer by means of a light beam having a first wavelength to provide an interference pattern on an array of detector points;
   (b) measuring a plurality of intensities of the interference pattern at each of a plurality of phases of the interference pattern, respectively, by measuring a plurality of signals produced at one of the detector points and, for that detector point, computing a phase of the interference pattern for the first wavelength;
   (c) repeating steps (a) and (b) for a second wavelength;
   (d) computing an equivalent phase for that detector point by computing the difference between the phases computed for that detector point at the first and second wavelengths, respectively; and
   (e) repeating steps (a) through (d) for each of the detector points.

2. The method of claim 1 including computing an equivalent optical path difference for that detector by multiplying the equivalent phase at that detector point by an equivalent wavelength for an imaginary two-beam interference pattern of the first and second wavelengths and dividing the result by $2\pi$.

3. The method of claim 2 including resolving $2\pi$ ambiguities of the equivalent phases by adding or subtracting integer multiples of $2\pi$ therefrom to make the differences between adjacent equivalent phases between adjacent detector points less than $\pi$.

4. The method of claim 3 including using equivalent phases to resolve the $2\pi$ ambiguities of the phases corresponding to the first wavelength by adding or subtracting integer multiples of the first wavelength to or from the optical path difference corresponding to the first wavelength to make the difference between the optical path difference corresponding to the first wavelength and the equivalent optical path difference less than one-half of the first wavelength.

5. The method of claim 4 including computing the optical path differences corresponding to the first wavelength by multiplying the first wavelength by the phase corresponding to the first wavelength and dividing the result by $2\pi$.

6. The method of claim 2 including computing the equivalent wavelength by dividing the product by the first and second wavelengths by the difference between the first and second wavelengths.

7. The method of claim 1 wherein the light beam recited in step (a) is a laser beam.

8. The method of claim 1 wherein the array of detector points is included in an array of separate detector elements.

9. The method of claim 1 wherein step (b) includes obtaining the plurality of phases of the interference pattern by shifting the reference mirror.

10. The method of claim 1 wherein the test surface is an aspheric surface.

11. The method of claim 10 wherein there is a large slope difference between the aspheric surface producing the interference pattern on the array of detector points and a spherical reference surface.

12. The method of claim 10 including displaying a contour map of the aspheric surface on a screen.

13. The method of claim 10 including the step of displaying a phase map of the aspheric surface on a display.

14. The method of claim 1 wherein a fringe spacing corresponding to equivalent wavelength is greater than two times the center-to-center spacing between the detector points of the array.

15. The method of claim 1 wherein an effective area of each of the detector points is small compared to fringe spacings at the first and second wavelengths.

16. The method of claim 13 including obtaining a small effective detector area by aligning a mask with the array of detector points, the aligned mask having a plurality of apertures of predetermined area aligned with each detector point, respectively.

17. The method of claim 15 including positioning a light intensifier between the mask and the array of detector points.

18. The method of claim 1 including eliminating data points corresponding to certain detector points by computing contrast of fringes and comparing it to a preset threshold, and eliminating the data points if the fringe contrast is less than the predetermined threshold.

19. A method of operating a phase-shifting interferometer, the method comprising the steps of:
   (a) illuminating a reference mirror via a reference arm of the interferometer and illuminating a test surface via a test arm of the interferometer by means of a beam having a first wavelength to provide an interference pattern on an array of detector points;
   (b) measuring a plurality of intensities of the interference pattern at each of a plurality of phases of the interference pattern, respectively, by measuring a plurality of signals produced at one of the detector points, and, for each detector point, computing a phase of the interference pattern for the first wavelength;
   (c) repeating steps (a) and (b) for each detector point;
   (d) repeating steps (a) through (c) for a second wavelength; and
   (e) computing an equivalent phase for each detector point by computing the difference between the phases computed for that detector at the first and second wavelengths, respectively.

20. A method of operating a phase-shifting interferometer, the method comprising the steps of:
   (a) illuminating a reference mirror via a reference arm of the interferometer and illuminating a test surface via a test arm of the interferometer by means of a light beam having a first wavelength to provide an interference pattern on an array of detectors;
   (b) measuring a plurality of intensities of the interference pattern at each of a plurality of phases of the interference pattern, respectively, by measuring a plurality of signals produced at one of the detectors;

(c) repeating steps (a) and (b) for a second wavelength;

(d) repeating steps (a) through (c) for each of the detectors of the array; and (e) computing an equivalent phase for each detector from the intensities measured by that detector at the first and second wavelengths.

21. A method of operating a phase-shifting interferometer, the method comprising the steps of:

(a) illuminating a reference mirror via a reference arm of the interferometer and illuminating a test surface via a test arm of the interferometer by means of a light beam having a first wavelength to provide an interference pattern on an array of detector points;

(b) measuring a plurality of intensities of the interference pattern at each of a plurality of phases of the interference pattern, respectively, by measuring a plurality of signals produced at one of the detectors;

(c) repeating steps (a) and (b) for each detector of the array;

(d) repeating steps (a) through (c) for a second wavelength; and (e) computing an equivalent phase for each detector from the intensities measured by that detector at the first and second wavelengths.

22. A phase-shifting interferometer comprising in combination:

(a) first means for illuminating both a reference mirror via a reference arm of the interferometer and a test surface via a test arm of the interferometer with a beam having a first wavelength to provide interference patterns on an array of detectors;

(b) second means for illuminating both the reference mirror via the reference arm and the test surface via the test arm by means of a beam having a second wavelength to provide interference patterns on the array of detectors;

(c) means for precise shifting of the phases of the interference patterns by predetermined amounts;

(d) means for measuring a plurality of intensities of the interference patterns at each of the phases of the interference patterns by measuring a plurality of signals produced by the detectors at the various phases of the interference patterns; and (e) means for computing an equivalent phase for each detector by computing the difference between the phases computed for that detector at the first and second wavelengths, respectively.

23. A phase-shifting interferometer comprising in combination:

(a) first means for illuminating both a reference mirror via a reference arm of the interferometer and a test surface via a test arm of the interferometer with a beam having a first wavelength to provide interference patterns on an array of detectors;

(b) second means for illuminating both the reference mirror via the reference arm and the test surface via the test arm by means of a beam having a second wavelength to provide interference patterns on the array of detectors;

(c) means for precise shifting of the phases of the interference patterns by predetermined amounts;

(d) means for measuring a plurality of intensities of the interference patterns at each of the phases of the interference patterns at each detector by measuring a plurality of signals produced by each of the detectors at various phases of the interference patterns; and (e) means for computing an equivalent phase for each detector from the intensities measured by that detector at the first and second wavelengths.

24. The phase shifting interferometer of claim 23 including means for computing an equivalent optical path difference for each detector by multiplying the equivalent phase for that detector by an equivalent wavelength of an imaginary two-beam interference pattern of the first and second wavelengths and dividing the result by $2\pi$.

25. The phase-shifting interferometer of claim 23 including means for resolving $2\pi$ ambiguities after computing the equivalent phase by adding or subtracting integer multiplies of $2\pi$ to the equivalent phase to make the differences between adjacent equivalent phases less than $\pi$.

26. The phase-shifting interferometer of claim 25 including means for resolving $2\pi$ ambiguities of the phases corresponding to the first wavelength by adding or subtracting integer multiples of the first wavelength to or from an optical path difference corresponding to the first wavelength to make the difference between the optical path difference corresponding to the first wavelength and the equivalent optical path difference less than one half of the first wavelength.

* * * * *